United States Patent
Kailash et al.

(10) Patent No.: US 9,379,895 B2
(45) Date of Patent: Jun. 28, 2016

(54) HTTP AUTHENTICATION AND AUTHORIZATION MANAGEMENT

(75) Inventors: Kailash Kailash, San Jose, CA (US); Shashidhara Mysore Nanjundaswamy, Bangalore (IN); Amarnath Mullick, Chandannagar (IN); Jose Raphel, Austin, TX (US)

(73) Assignee: Zscaler, Inc., San Jose, CA (US)

( * ) Notice: Subject to any disclaimer, the term of this patent is extended or adjusted under 35 U.S.C. 154(b) by 1398 days.

(21) Appl. No.: 12/179,492

(22) Filed: Jul. 24, 2008

(65) Prior Publication Data

US 2010/0024014 A1    Jan. 28, 2010

(51) Int. Cl.
G06F 7/04 (2006.01)
H04L 9/32 (2006.01)
H04L 29/06 (2006.01)

(52) U.S. Cl.
CPC .............. *H04L 9/3213* (2013.01); *H04L 63/08* (2013.01); *H04L 63/083* (2013.01); *H04L 63/0815* (2013.01); *H04L 63/102* (2013.01)

(58) Field of Classification Search
CPC ....... G06F 21/31; H04L 63/083; H04L 63/08; H04L 63/102; H04L 63/0815; H04L 9/3213
USPC .......................................................... 726/6
See application file for complete search history.

(56) References Cited

U.S. PATENT DOCUMENTS

| | | | |
|---|---|---|---|
| 6,711,264 B1 | 3/2004 | Matsumoto et al. | |
| 6,779,118 B1 | 8/2004 | Ikudome et al. | |
| 7,231,661 B1* | 6/2007 | Villavicencio et al. | 726/4 |
| 7,827,318 B2 | 11/2010 | Hinton et al. | |
| 2001/0007098 A1* | 7/2001 | Hinrichs et al. | 705/14 |
| 2002/0023159 A1 | 2/2002 | Vange et al. | |
| 2002/0169961 A1* | 11/2002 | Giles et al. | 713/175 |
| 2003/0177250 A1 | 9/2003 | Oliver et al. | |
| 2004/0073666 A1 | 4/2004 | Foster et al. | |
| 2004/0088349 A1 | 5/2004 | Beck et al. | |
| 2006/0021004 A1* | 1/2006 | Moran et al. | 726/2 |
| 2006/0083165 A1* | 4/2006 | McLane et al. | 370/229 |
| 2006/0112016 A1 | 5/2006 | Ishibashi | |
| 2006/0185007 A1 | 8/2006 | Hourselt | |
| 2006/0230265 A1* | 10/2006 | Krishna | 713/158 |
| 2007/0101418 A1* | 5/2007 | Wood et al. | 726/8 |

(Continued)

OTHER PUBLICATIONS

Vipin Samar, "Single Sign-On using Cookies for Web Applications," pp. 1-6, 1999.*

(Continued)

*Primary Examiner* — Luu Pham
*Assistant Examiner* — Canh Le
(74) *Attorney, Agent, or Firm* — Clements Bernard PLLC; Lawrence A. Baratta, Jr.; Christopher L. Bernard

(57) ABSTRACT

Systems, methods and apparatus for a distributed security that provides authentication and authorization management. The system can include a source processor that is used to identify the source associated with a request for authentication or authorization. The source processor can maintain the initial source associated with the request through the use of an association token. The associate token can be transmitted with each subsequent request that includes authentication or authorization data. The source processor can use the associate token to verify that the source associated with the initial request is the same as the source associated with subsequent authentication and authorization requests.

17 Claims, 12 Drawing Sheets

(56) References Cited

U.S. PATENT DOCUMENTS

| | | | |
|---|---|---|---|
| 2007/0124482 A1* | 5/2007 | Lee et al. | 709/228 |
| 2007/0220259 A1 | 9/2007 | Pavlicic | |
| 2008/0046993 A1 | 2/2008 | Mullick et al. | |
| 2008/0195740 A1 | 8/2008 | Lowell et al. | |
| 2008/0235522 A1 | 9/2008 | Suzuki et al. | |
| 2008/0301444 A1 | 12/2008 | Kim et al. | |
| 2009/0080661 A1* | 3/2009 | Brown et al. | 380/279 |
| 2009/0132713 A1* | 5/2009 | Dutta et al. | 709/227 |
| 2009/0228357 A1* | 9/2009 | Turakhia | 705/14 |
| 2009/0235069 A1 | 9/2009 | Sonnega et al. | |
| 2009/0319769 A1 | 12/2009 | Betouin et al. | |
| 2010/0017596 A1 | 1/2010 | Schertzinger | |
| 2010/0042735 A1 | 2/2010 | Blinn et al. | |
| 2010/0082771 A1* | 4/2010 | Wood et al. | 709/219 |

OTHER PUBLICATIONS

Maryam Chalandar et al. "A Centralized Cookie-Based Single Sign-on in Distributed Systems," IEEE, pp. 1-3.*

PCT International Search Report and the Written Opinion, PCT/US2009/051682, Jan. 27, 2010, 12 pages.

* cited by examiner

HTTP AUTHENTICATION AND AUTHORIZATION MANAGEMENT

BACKGROUND

This disclosure relates to security provisioning.

The prevalence and accessibility of computer networks requires security measures to protect valuable information. An enterprise that implements the security system can require a user to be authenticated and authorized before using the network. The authentication and authorization checks in the security system are prone to processing inefficiencies and can require many resources within the enterprise to maintain the systems. For example, the security system may require multiple analysis of the request to determine if the user that submitted the request is authenticated and authorized.

Additionally, the authentication and authorization data that maintains the state of the user can be subject to replay attacks by unauthorized users. For example, an unauthorized user can attempt to generate fraudulent authorization or authentication data. Other unauthorized users can attempt to improperly obtain authentication and authorization data that is directed to a valid user through theft.

SUMMARY

The subject matter described in this specification is directed to distributed security provisioning. Security processing for an enterprise can, for example, be provided external to a network edge of the enterprise.

In general, one aspect of the subject matter described in this specification can be embodied in methods that include the actions of receiving at a processing node a request for a domain from a client browser; determining at the processing node whether the request includes domain authorization data for the requested domain; if the request for the domain includes the domain authorization data, allowing the request; if the request for the domain does not include the domain authorization data, requesting authorized user data from the client browser; in response to the request for the authorized user data, determining if the client browser provided the authorized user data; if the client browser provided the authorized user data, generating at the processing node the domain authorization data, providing the domain authorization data to the client browser, and allowing the request for the domain; and if the client browser did not provide the authorized user data, requesting user authorization from the client browser. Other implementations of this aspect include corresponding systems, apparatus, and computer program products.

Another aspect of the subject matter described in this specification can be embodied in methods that include the actions of receiving at a processing node a first request for a domain from a client browser, the client browser associated with a first communication address; identifying a first authorized user data associated with the first request; identifying at the processing node the first communication address associated with the client browser; associating at the processing node the first communication address of the client browser with the first authorized user data; encrypting at the processing node the first authorized user data and the associated first communication address to generate a first associated authorization data; and providing the first associated authorization data to the client browser at the first communication address. Other implementations of this aspect include corresponding systems, apparatus, and computer program products.

Another aspect of the subject matter described in this specification can be embodied in methods that include the actions receiving authenticated user data at an authority node; defining a plurality of epochs, each epoch identified by an epoch id; associating the authenticated user data with a current epoch ID for a current epoch; obtaining a current epoch key pair for the current epoch, the current epoch key pair comprising a current public epoch key and a current private epoch key, wherein one attribute of the current public epoch key is the current epoch id; encrypting the associated authenticated user data with the current private epoch key to generate authentication data; providing the current public epoch key to an external security service; and providing the authentication data to the external security service. Other implementations of this aspect include corresponding systems, apparatus, and computer program products.

Another aspect of the subject matter described in this specification can be embodied in methods that include the actions receiving at a processing node a current public epoch key of a current epoch key pair, wherein one attribute of the current public epoch key is a current key epoch ID that identifies the current epoch of the current public epoch key; receiving at the processing node authorized user data associated with a request; decrypting at the processing node the authorized user data using the public epoch key; determining if the decryption of the authorized user data was successful; if the decryption of the authorized user data was successful, identifying at the processing node a user epoch ID from the decrypted authorized user data; comparing at the processing node the user epoch ID to the current key epoch ID of the current public epoch key; determining at the processing node whether the user epoch ID is a valid epoch id; if the user epoch ID is a valid epoch ID, processing the decrypted user data and the request. Other implementations of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
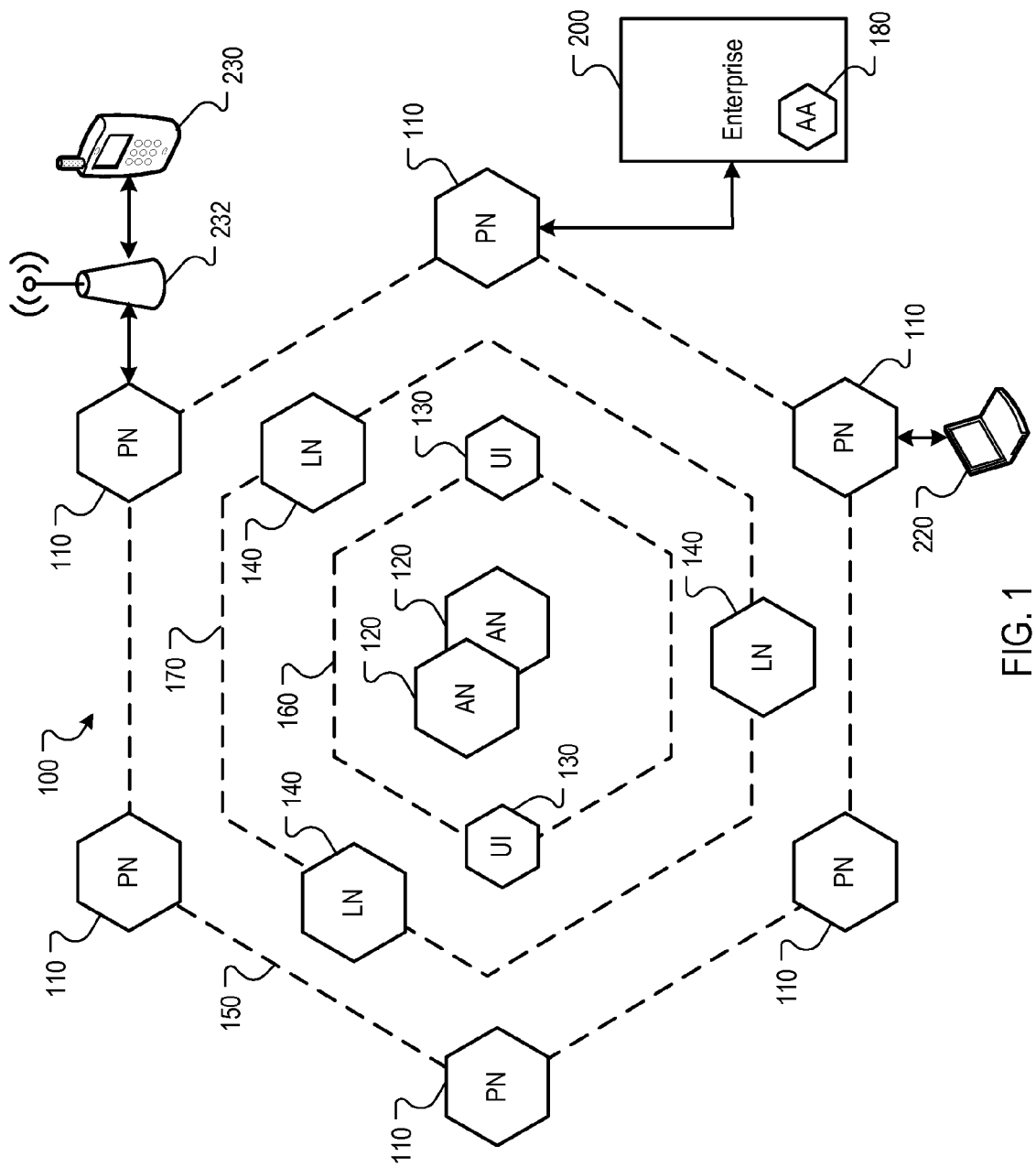
FIG. 1 is a block diagram of a distributed security system.

FIG. 1 is a block diagram of a distributed security system 100. The system 100 can, for example, be implemented as an overlay network in a wide area network (WAN), such as the Internet. The system 100 includes content processing nodes 110 that detect and preclude the distribution of security threats, e.g., malware, spyware, and other undesirable content sent from or requested by an external system. Example external systems can include an enterprise 200, a computer device 220, and a mobile device 230, or other network and computing systems.

§1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is processed through a processing node 110.

Each processing node 110 can generate a decision vector D=[d1, d2, . . . , dn] for a content item of one or more parts C=[c1, c2, . . . , cm]. Each decision vector can identify a threat classification, e.g., clean, spyware, malware, undesirable content, innocuous, unknown, etc. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. A content item is violating if, for any part C=[c1, c2, . . . , cm] of the content item, at any processing node 110, any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the processing nodes 110.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines 117 and dictionaries for the processing nodes.

Other application layer functions can also be provided in the application layer, such as a user interface front-end 130. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network traffic processed by the processing nodes 110 for each external system.

In some implementations, the logging node 140 data can be anonymized so that data identifying an enterprise is removed or obfuscated. For example, identifying data can be removed to provide an overall system summary of security processing for all enterprises and users without revealing the identity of any one account. In another example, identifying data can be obfuscated, e.g., provide a random account number each time it is accessed, so that an overall system summary of security processing for all enterprises and users can be broken out by accounts without revealing the identity of any one account. In other implementations, the identifying data and/or logging node 140 data can be further encrypted, e.g., so that only the enterprise (or user if a single user account) can have access to the logging node 140 data for its account. Other processes of anonymizing, obfuscating, or securing logging node 140 data can also be used.

In some implementations, an access agent 180 can be included in the external systems. For example, an access agent 180 is deployed in the enterprise 200. The access agent 180 can, for example, facilitate security processing by providing a hash index of files on a client device to a processing node 110, or can facilitate authentication functions with a processing node 110, e.g., by assigning tokens for passwords and sending only the tokens to a processing node so that transmission of passwords beyond the network edge of the enterprise is minimized. Other functions and processes can also be facilitated by an access agent 180.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, choose one or both of these modes.

For example, a browser may be configured either manually or through an access agent 180 to access a processing node 110 in a forward proxy mode. In the forward proxy mode, all accesses are addressed to processing node 110.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, at the within the enterprise an access agent 180 can be configured to perform MPLS labeling.

In another transparent proxy mode example, a protected system, such as the enterprise 200, may identify a processing node 110 as a next hop router for communication with the external servers.

§2.0 Example Detailed System Architecture and Operation

Figure 2:
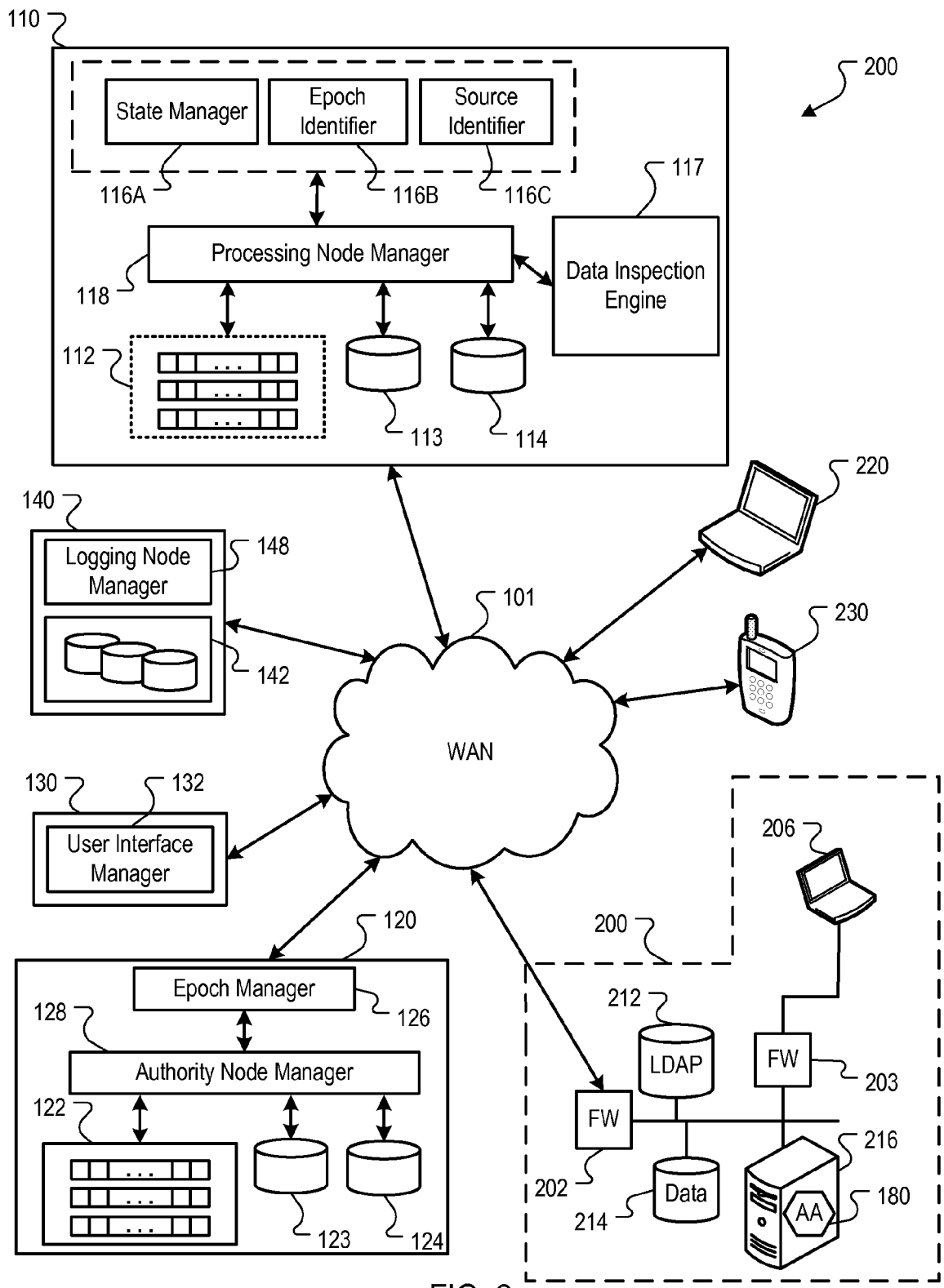
FIG. 2 is a block diagram of the system of FIG. 1 in which the components of FIG. 1 are illustrated in more detail.

FIG. 2 is a block diagram of the system of FIG. 1 in which the components of FIG. 1 are illustrated in more detail. Although only one representative component processing node 110, authority node 120 and logging node 140 are illustrated, there can be many of each of the component nodes 110, 120 and 140 present in the system 100.

A wide area network (WAN) 101, such as the Internet, or some other combination of wired and/or wireless networks, connects in data communication the processing node 110, authority node 120 and logging node 140. The external systems 200, 220 and 230 likewise communicate over the WAN 101 with each other or other data providers and publishers. Some or all of the data communication of each of the external systems 200, 220 and 230 can be processed through the processing node 110.

FIG. 2 also shows the enterprise 200 in more detail. The enterprise 200 can, for example, include a firewall 202 protecting an internal network that can include one or more enterprise servers 206, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 104 may store, for example, user login credentials for registered users of the enterprise 200 system. Such credentials can include a user identifiers, login passwords, and a login history associated with each user identifier. The other data 214 can include sensitive information, such as bank records, medical records, trade secret information, or any other information warranting protection by one or more security measures.

In some implementations, a server access agent 180 can facilitate authentication functions with a processing node 110, e.g., by assigning tokens for passwords and sending only the tokens to a processing node 110 so that transmission of passwords beyond the network edge of the enterprise is minimized. Other functions and processes can also be facilitated by the server access agent 180.

The computer device 220 and the mobile device 230 can also store information warranting security measures, such as personal bank records, medical information, and login information, e.g., login information to the server 216 of the enterprise 200, or to some other secured data provider server.

§2.1 Example Processing Node Architecture

In some implementations, the processing nodes 110 are external to network edges of the external systems 200, 220 and 230. Each processing node 110 stores security policies 113 received from the authority node 120 and monitors content items requested by or sent from the external systems 200, 220 and 230. In some implementations, each processing node 110 can also store a detection process filter 112 and/or threat data 114 to facilitate the decision of whether a content item should be processed for threat detection.

A processing node manager 118 can manage each content item in accordance with the security policy data 113, and the detection process filter 112 and/or threat data 114, if stored at the processing node 110, so that security policies for a plurality of external systems in data communication with the processing node are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" can be precluded. Those content items having an unknown status, e.g., content items that have not been processed by the system 100, can be threat detected to classify the content item according to threat classifications.

In some implementations, the processing node 110 can include a state manager 116a. The state manager 116a can be used to maintain the authentication and the authorization states of users that submit requests to the processing node. Maintenance of the states through the state manager 116a can minimize the number of authentication and authorization transactions that are necessary to process a request. An example of a state manager 116a is described in FIG. 3-6.

In some implementations, the processing node 110 can include an epoch processor 116b. The epoch processor 116b can be used to analyze authentication data that originated at an authority node 120. The epoch processor 116b can use an epoch ID to further validate the authenticity of authentication data. An example of an epoch processor 116b is described in FIG. 7.

In some implementations, the processing node can include a source processor 116c. The source processor 116c can be used to verify the source of authorization and authentication data. The source processor 116c can identify improperly obtained authorization and authentication data, enhancing the security of the network. An example of a source processor 116c is described in FIG. 7.

Because the amount of data being processed by the processing nodes 110 can be substantial, the detection processing filter 112 can be used as the first stage of an information lookup procedure. For example, the detection processing filter 112 can be used as a front end to a looking of the threat data 114. Content items can be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence.

Each content item can have an information key that is hashed. For example, the processing node manager 118 may identify the URL address of a URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 can improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 can thus improve performance of queries where the answer to a request for information is usually negative. Such instances can include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information.

In some implementations, the detection processing filter 112 can be a Bloom filter implemented by a single hash function. The Bloom filter can be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§2.2 Example Authority Node Architecture

In general, the authority node 120 includes a data store that stores master security policy data 123 for each of the external systems 200, 220 and 230. An authority node manager 128 can be used to manage the master security policy data 123, e.g., receive input from users of each of the external systems defining different security policies, and can distribute the master security policy data 123 to each of the processing nodes 110. The processing nodes 110 then store a local copy of the security policy data 113.

The authority node 120 can also store a master detection process filter 122. The detection processing filter 122 can include data indicating whether content items have been processed by one or more of the data inspection engines 116 in any of the processing nodes 110. The authority node manager 128 can be used to manage the master detection processing filter 122, e.g., receive updates from a processing nodes 110 when a processing node 110 has processed a content item and update the master detection processing filter 122. In some implementations, the master detection processing filter 122 can be distributed to the processing nodes 110, which then store a local copy of the detection processing filter 112.

In some implementations, the authority node 120 can include an epoch manager 126. The epoch manager 126 can be used to generate authentication data associated with an epoch ID. The epoch ID of the authentication data is a verifiable attribute of the authentication data that can be used to identify fraudulently created authentication data. An example of a epoch manager 126 is described in FIG. 7.

In some implementations, the detection processing filter 122 can be a guard table. The processing node 110 can, for example, use the information in the local detection processing filter 112 to quickly determine the presence and/or absence of information, e.g., whether a particular URL has been checked for malware; whether a particular executable has been virus scanned, etc.

The authority node 120 can also store master threat data 124. The master threat data 124 can classify content items by threat classifications, e.g., a list of known viruses, a list of known malware sites, spam e-mail domains, etc. The authority node manager 128 can be used to manage the master threat data 124, e.g., receive updates from a processing nodes 110 when a processing node 110 has processed a content item and update the master threat data 124 with any pertinent results. In some implementations, the master threat data 124 can be distributed to the processing nodes 110, which then store a local copy of the threat data 114.

In some implementations, the authority node 120 can also monitor the health of each processing node 110, e.g., the resource availability in each processing node 110, detection of link failures, etc. Based on the observed health of each process node 110, the authority node 120 can redirect traffic among processing nodes 110 and/or balance traffic among the processing nodes 110. Other remedial actions and processes can also be facilitated by the authority node 110.

§3.0 States of a User in the State Management System

Figure 3:
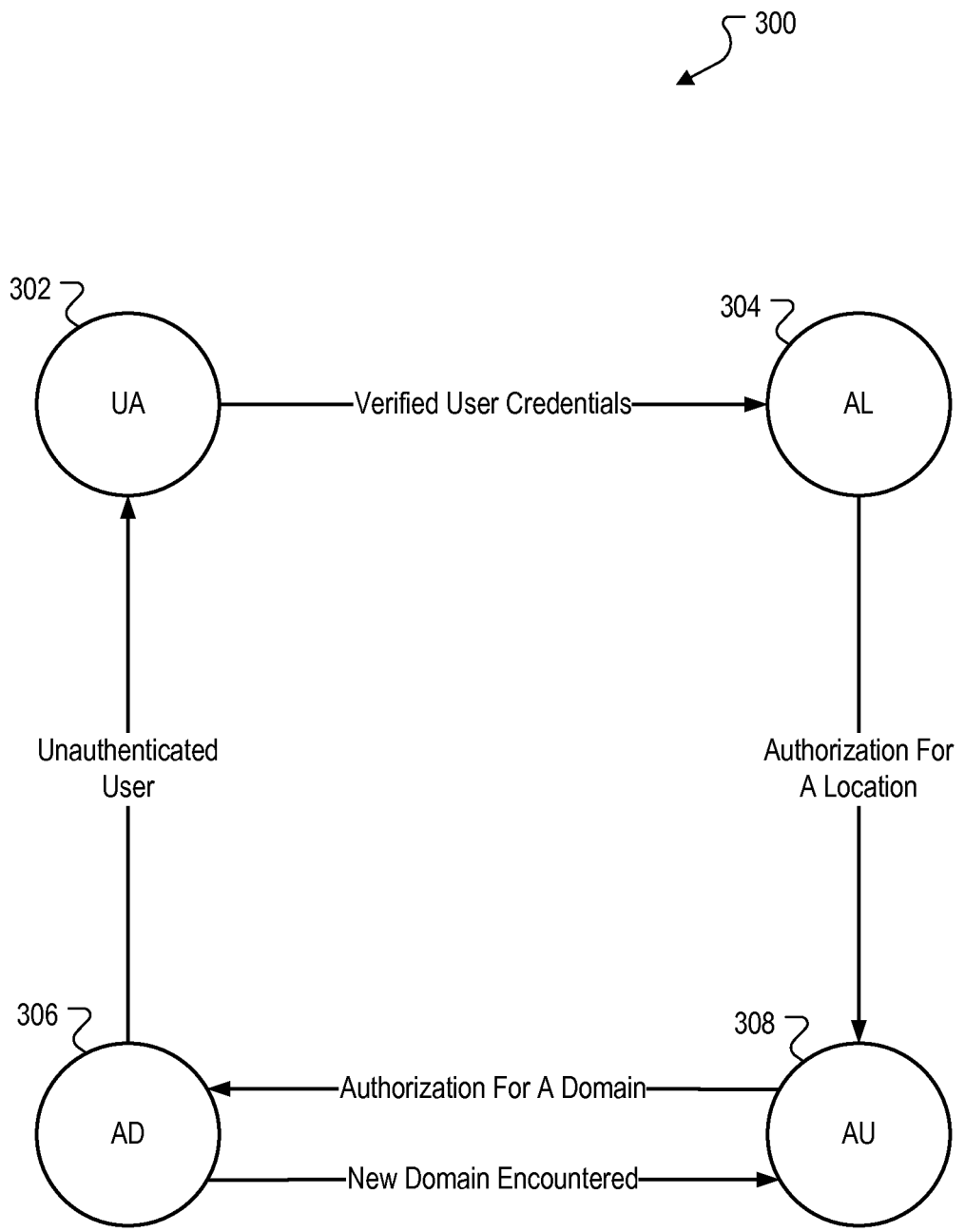
FIG. 3. is a state diagram of the different states maintained by a state manager.

FIG. 3. is a state diagram 300 of the different states maintained by the state manager 116a. Each state of the state diagram 300 identifies a different level of authentication and authorization of a user. The state manager 116a can maintain these different states and process requests to the processing node 110 based on the state of the user.

A request to the processing node 110 is processed by the stage manager 116a based on the level of authentication and/or authorization the user has obtained. In some implementations, authentication refers to the validation of the identity of the user. User credentials can be used to validate the identity of a user. For example, a user may be authenticated by supplying a user name and password. Authorization can refer to the eligibility of a validated user to complete an action. For example, an authenticated user can may be eligible to request content from domains that provide informational content, but not from domains associated with file sharing. Thus, the user is authorized for the domains associated with provision of informational content, but not for the domains associated with file sharing.

Different levels of authentication and authorization are identified by the different states in the state diagram 300. If the user has not obtained any level of authentication or authorization, the user is assigned to the unauthenticated (UA) state 302. The UA state 302 means that the user (or a client device being used by the user) has not provided any verified credentials to the state manager 116a, and thus the user must be authenticated before the request can be processed. The user can obtain authentication by providing credentials to the state manager 116a.

If the state manager 116a is able to verify the user credentials, the user has obtained authentication and can be assigned to the authenticated for a location (AL) state 304. A user in the AL state 304 is authenticated to transmit requests to the domain of the processing node 110. Thus, the state manager 116a has validated the identity of the users in the AL state 304 and can attempt to process requests from the users. However, the authorization level of a user in the AL state has not been determined. Thus, a user must obtain authorization before it can request content from the processing node 110.

In some implementations, the AL state 304 is a transient state that is reached after the user has been authenticated, but before the user has been authorized to request content from any domain. Thus, in some implementations, the AL state 304 is maintained through the component responsible for the authentication, e.g., the access agent 180 and/or the authority node 120. Accordingly, state manager 116a may not be responsible for assigning a user to the AL state 304. However, the state manager 116a can identify when the user is in the AL state 304 and obtain the authorization necessary to move the user to the authenticated user state 306.

When a user is in the AL state 304 obtains authorization to request content from the processing node 110, the state manager 116a assigns the user to the authenticated user (AU) state 306. The AU state 306 means that the identity of the user has already been validated, and that processing node 110 is able to determine what level of authorization the user has. The processing node 110 can authorize requests of the user. The AU state does not enable the user to request content directly from domains, such as the domain of a target site. In order for the user to obtain content from the domain directly rather than through the processing node 110, the user must be authorized for the specific domain that is subject to the request.

Once the user is authorized for a specific domain, the user can be assigned to the authorized for a domain (AD) state for the specific domain. The AD state 306 means that the identity of the user has already been validated, the validated user is an authorized user of the processing node 110 such that the processing node 110 can determine whether a request is to be allowed, and that processing node 110 has already determined the validated user is authorized to request content from the authorized domain.

The state diagram 300 identifies how the state manager 116a maintains the states of the user. The state manager 116a does not require each request transmitted by the user to originate in the UA state 302. Rather, the state manager 116a maintains the authorization state of the user by interpreting data that is transmitted with each request. The data (or lack of data) transmitted by the user can identify the user as in the UA state 302, the AL state 304, the AU state 306, or the AD state 308. Accordingly, the state manager 116a can identify the state of the user submitting the request, and the effort to authenticate and authorize users is minimized.

For example, when a new domain is encountered through a request, the state of the user will not be in the AD state for the new domain. However, the state manager 116a does not default the user to the UA state 302. Rather, the state manager 116a determines if the user that submitted the request is in AU state 306 or the AL state 304. Depending on what state the user is in when the request is received, the state manager 116a can minimize the transactions needed to authorize the user's request.

§4.0 The State Management System

Figure 4:
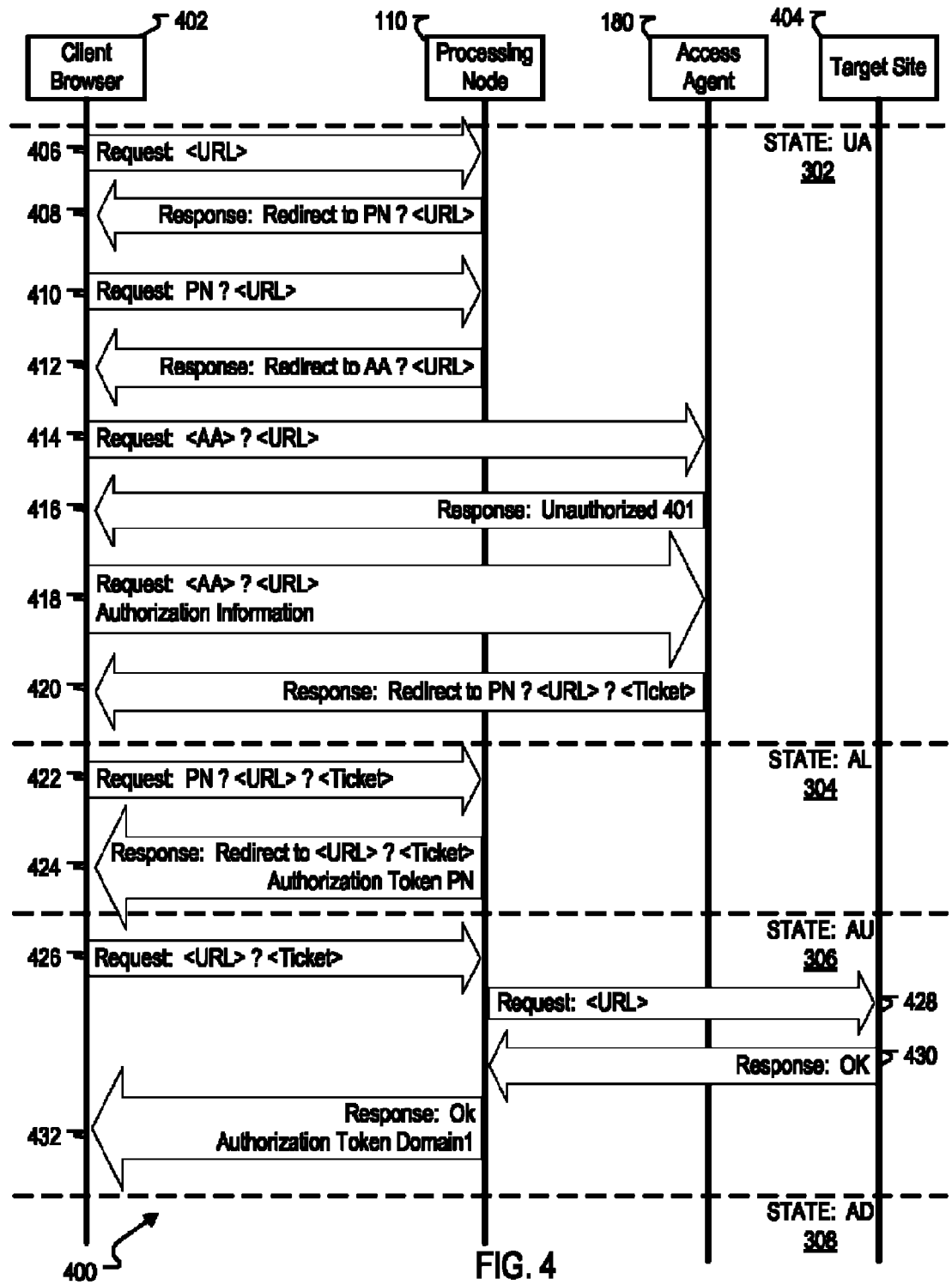
FIG. 4 is an example timing diagram of the management of unauthenticated and unauthorized requests by the state manager.

FIG. 4 is a timing diagram 400 of the management of an unauthenticated and unauthorized request by the state manager 116a. In the diagram 400, a client browser 402 submits a request 406, e.g. an HTTP request that includes a Uniform Resource Locator (URL) for content accessible at a domain, e.g., target site 304. The state manager 116a of the processing node 110 determines whether to allow the request 406 based on the state of the user that submitted the request. For example, the state manager 116a can allow a request for content at a domain if the user is in a state that is authorized to request content from that domain.

The state manager 116a can determine the state of the user based on the data transmitted with the request by the client browser 402. The state manager 116a can make this determination because with any request to a domain, the client browser 402 transmits data applicable to the domain. Included in the data transmitted is authentication and authorization data for the domain that was provided by the state manager 116a. For example, when a user visits an Email Site on Domain E, the client browser 402 transmits any authentication and/or authorization data provided by the state manager 116a for the Domain E. One method of storing data to ensure that the data for a domain is transmitted to that domain with each request is by storing the data as an http cookie assigned to the domain. Other methods of storing the data can also be used.

Based on the state of the user, the state manager 116a can determine whether to allow the request, or whether to obtain additional authentication and/or authorization. Because the client browser 402 is the interface for the user, the state of the user is equivalent to the state of the client browser 402 that submitted the user request. Thus, in the diagram 400, the state of the client browser 402 is used to refer to the state of the user.

§4.1 Identification of the Unauthenticated (UA) State

A request from a client browser 402 in the UA state 302 is not processed by the processing node 110 because the user has not been authenticated. In some implementations, the state manager 116a can determine that the client browser 402 is in the UA state 302 by determining that the client browser 402 is not in the AL state 304, the AU state 306 or the AD state 308. In some implementations, the state manager 116a must first determine that the client browser 402 is not in the AD state 308, then the AU state 306. This method is used because the AD state 308 inherently includes the AU state 306.

The state manager 116a can determine if the client browser 402 is in the AD state 308 for a domain by identifying domain authorization data submitted with a request for the domain. The domain authorization data can be data that indicates that the client browser 402 has been authorized by the state manager 116a to submit requests to the domain of a target site. If the client browser 402 is in the AD state 308 for the domain of the requested content, the client browser 402 provides domain authorization data with its request. If there is no domain authorization data submitted with a request for content from a domain, the client browser 402 is not in the AD state 308 for that domain.

For example, the client browser 402 can submit a request 406 for content at the target site. Because the request 406 is directed to the target site, the request 406 includes the URL of the target site. However, no data is passed in the request 406 that indicates that the client browser 402 is authorized to visit the domain of the target site. Thus, the state manager 116a can determine that the client browser 402 is not in the AD state 308 for the domain of the target site.

After determining that the client browser 402 is not in the AD state 308, the state manager 116a can determine if the client browser 402 is in the AU state 306. The client browser 402 can be determined to be in the AU state 306 if the client browser 402 can provide authorized user data to the state manager 116a. The authorized user data can be data that indicates that the client browser 402 has been authorized by the state manager 116a to submit requests to the domain of the processing node 110. The authorized user data can be used by the processing node to identify the user policy of the user. The authorized user data is associated with the domain of the processing node. The state manager 116a can solicit this authorized user data by sending the client browser 402 a redirect request 408.

For example, the state manager 116a submits the redirect response 408 to the client browser 402 after determining that the client browser 402 is not in the AD state 308 for the requested domain. The response 408 requires the client browser 402 to submit a request 410 for the target site 404 to the state manager 116a of the processing node 110. The request 410 seeks the contents of the target site 404 from the processing node 110, thus the original URL of the target site 404 is submitted as a query parameter of the request 410. Because the request is directed to the processing node 110, the target domain of the request 410 is the domain of the processing node 110. The state manager 116a identifies any data submitted with the request 410 to the domain of the state manager 116a. The state manager 116a can determine that the client browser 402 is not in the AU state 306 because no authorized user data is submitted from the client browser 402 with the request 410 to the processing node 110.

If the state manager 116a determines that the client browser 402 is not in the AU state 306, then the state manager 116a determines if the client browser 402 is in the AL state 304. Although in some implementations, the AL state 304 is a transient state that is maintained by the node responsible for authentication, e.g., access agent 180, the state manager 116a can still determine when the client browser 402 is assigned to the AL state 304 by an access agent.

The state manager 116a can determine that the client browser 402 is in the AL state when the client browser 402 submits a request with authentication data, e.g., a user authentication ticket. The user authentication ticket can be data that indicates that the client browser 402 has been authenticated by the access agent 180. In some implementations, the user authentication ticket can be used to identify the user policy of the client browser 402.

For example, the state manager 116a can determine that neither the request 406 nor the request 410 included any authentication data. Thus, the state manager 116a can determine that the client browser is not in the AL state 304. Based on this the state manager 116a can determine that the client browser is in the only remaining state, the UA state 302.

§4.2 Transition from the UA State to the Authorized for a Location (AL) State

If the state manager 116a has identified the client browser 402 to be in the UA state 302, the processing node 110 cannot process any request from the client browser 402. Instead, the client browser 402 must obtain authentication for the processing node 110 to process the requests from the client browser 402. If the client browser 402 obtains authentication and is able to submit the obtained authentication data to the state manager 116a, the state manager 116a can modify the state of the client browser 402 to the AL state 304. The state manager 116a can trigger the authentication by redirecting the client browser 402 to the access agent 180.

For example, upon identifying the client browser 402 as in the UA state 302, the state manager 116a can submit a redirect response 412 to the client browser 402 to obtain authentication. The redirect response 412 requires the client browser 402 to submit a request 414 to the access agent 180. The access agent 180 can respond to a request 414 by notifying the client browser 402 that it is not authenticated. In a response 416 to the request 414, the access agent 180 can request authentication information from the client browser 402. The client browser 402 can prompt the user for authorization, and the user credentials can be passed to the access agent through a request 418. The access agent 180 receives the request 418, and if the user credentials are verified, the client browser 402 can be authenticated. Where a client browser 402 is authenticated, the access agent 180 can transmit authentication data back to the client browser 402.

In some implementations, after the access agent 180 authenticates the user credentials, the access agent 180 can obtain the user policy associated with the user credentials in the form of the authentication data, provided by the authority node 120 of FIG. 1, as discussed in Section 5.0 and Section 5.1. The access agent 180 can transmit the authentication data back to the client browser 402.

The client browser 402 now possesses the authentication data, and is in the AL state 304.

§4.3 Transition from the AL State to the Authorized User (AU) State

Once the client browser 402 is in the AL state, the state manager 116a can attempt to authorize the client browser 402. Because the AL state 304 is a transient state encountered prior to the AU state 306, the access agent 180 provides the authentication data to the client browser 402 as a parameter of a redirect response 420. The state manager 116a can verify the identity of the client browser 402 with the authentication data, and attempt to authorize the client browser 402. If the client browser 402 is authorized, the state manager 116a assigns the client browser 402 to the AU state 306.

For example, the client browser 402 can receive from the access agent 180 a redirect response 420 to the processing node 110. The redirect response 420 requires the client browser 402 to present the authentication data to the state manager 116a of the processing node 110. The state manager 116a of the processing node 110 receives the redirected request from the client browser, e.g. request 422. Because the request 422 includes authentication data, the state manager 116a can determine that the client browser is in the AL State 304. The state manager 116a can verify the use the data in the user authorization ticket to determine if the client browser 402 is an authorized user of the state manager 116a. If the client browser 402 is an authorized user, the state manager 116a can generate authorized user data based on the authentication data.

The client browser 402 now possesses the authorized user data, and is in the AU state 306.

§4.4 Transition from the AU State to the Authorized for a Domain (AD) State

Once in the AU state 306, the client browser 402 is authorized to submit requests to the processing node 110. Thus, a request cannot be directly to the target site 404, but rather the request is directed to the processing node 110 with the target site 404 as a query parameter. The processing node 110 can determine whether the client browser is authorized to request content from the target site 404, e.g., by examining the policy data 113 that specifies access privileges for the user. If the client browser 402 is authorized, the processing node 110 redirects the request of the client browser 402 back to the target site 404, with domain authorization data that indicates the client browser is authorized.

For example, after the state manager 116a of the processing node 110 provides the authorized user data in the response 424, the client browser 402 is in the AU state 306. Because the initial request 406 has still not been processed, as part of the response 424, the processing node 110 instructs the client browser 402 through a redirect request to submit a request to the target site 404. The redirected request, e.g., request 426, is directed to the target site 404 of the original URL, and includes the domain authorization data as a query parameter.

The redirected request from the client browser 402 is directed to the target site 404, but the processing node 110 still examines every request. Because the request has the domain authorization data as a query parameter, the processing node 110 allows the request after stripping the query parameter that include the domain authorization data, e.g., the data passed in the ticket query parameter of the request 426. The response from the target site 404 is also communicated through the processing node 110.

For example, the request 426 redirected the client browser 404 to the target site 404. The processing node 110 forwards the request to the target site 404 through request 328. The response from the target site 404 is sent back to the processing node 110, e.g., response 330.

Upon receiving the response from the target site 404, the state manager 116a transmits the domain authorization data back to the client browser 402 in a format that can be stored by the client browser and associated with the target site 404. For example, the response 432 from the processing node 110 can send the domain authorization data back as an http cookie for the domain of the target site 404. The client browser 402 now possesses the domain authorization data for the domain of the target site 404, and is in the AD state 308 for the domain.

§4.5 Subsequent Requests for a Domain from the AD State

Figure 5:
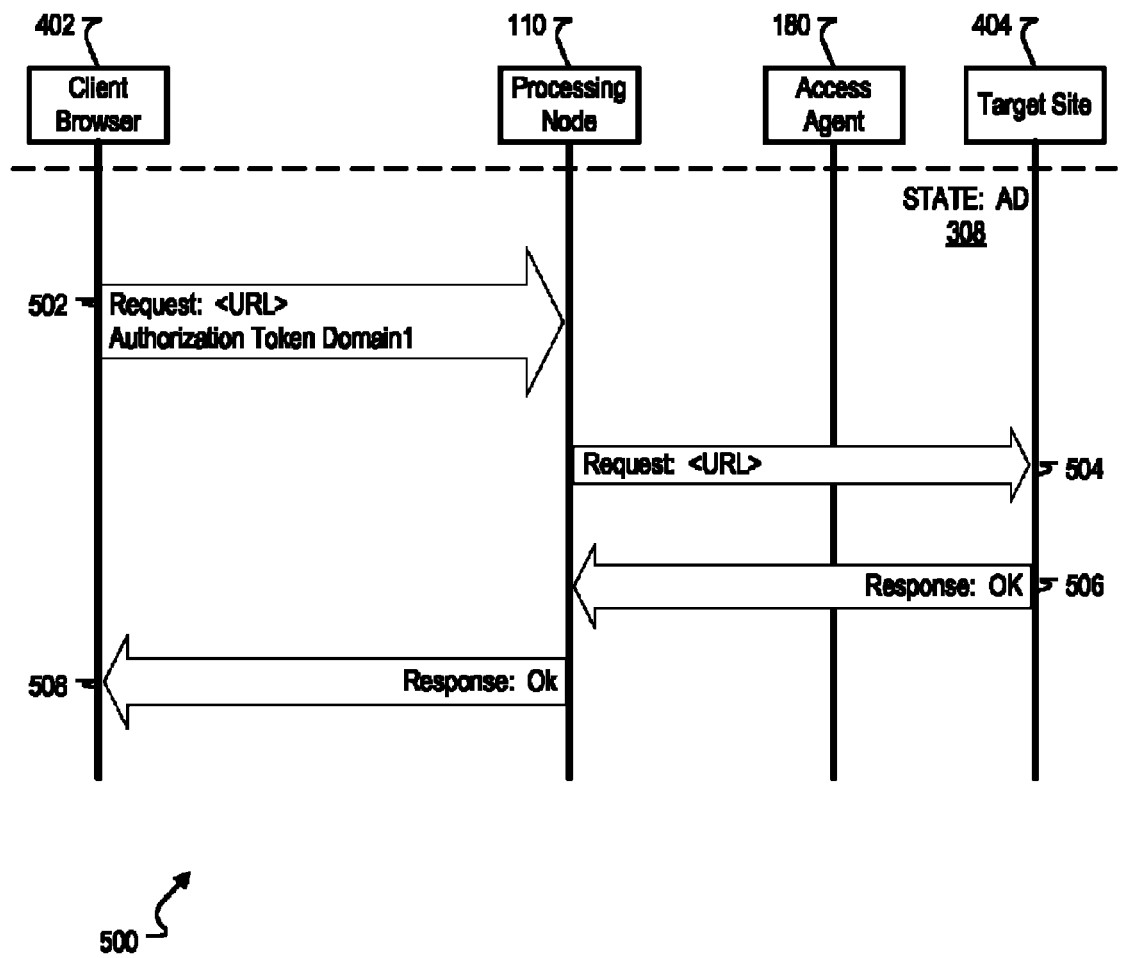
FIG. 5 is an example timing diagram of the management of a subsequent request to an authorized domain by the state manager.

FIG. 5 is an example timing diagram 500 of the management of a subsequent request to an authorized domain by the state manager 116a. In the realization 500, the processing node 110 processes a request for a domain from a client browser 402 in the AD state 308 for the domain. The processing node 110 is able to process the request without requesting additional authentication or authorization from the client browser.

After the client browser 402 is in the AD state 308 for a domain, the client browser 402 can receive a subsequent request for the target site 404 on the same domain. The client browser 402 can also receive a subsequent request for a different target site on the same domain. The state manager 116a of the processing node 110 can recognize that the client browser 402 is in the AD state 308 based on the data passed with the subsequent request.

For example, the client browser 402 may have obtained authorization to visit Company A Shopping Site on Domain 1. Thus, the client browser 402 has stored domain authorization data for Domain 1. Request 502 can be a subsequent request to the Company A Shopping Site on Domain 1. Alternatively, the request 502 can be a subsequent request to a different site on the Domain 1, e.g., Company A Consumer Reviews Site on Domain 1. Because the domain authorization data is associated Domain 1, for either of these requests the client browser 402 can submit the domain authorization data with the request. The state manager 116a can determine that the client browser 402 is in the AD state 308 for Domain 1 because the client browser 402 submitted domain authorization data with the request.

Once the state manager 116a identifies the request as a request from a client browser in the AD state 308, the state manager 116a allows the request without further authorization or authentication. For example, because the client browser is in the AD state 308 for Domain 1, the state manager 116a forwards a request for the URL to the target site 404, e.g., request 504, after stripping the domain authorization data, e.g., the data of the Authorization Token for Domain 1. The target site 404 can then respond to the client browser 402 through the processing node 110, e.g., response 506 and response 508.

§4.6 Subsequent Requests for a Domain from the AU State

Figure 6:
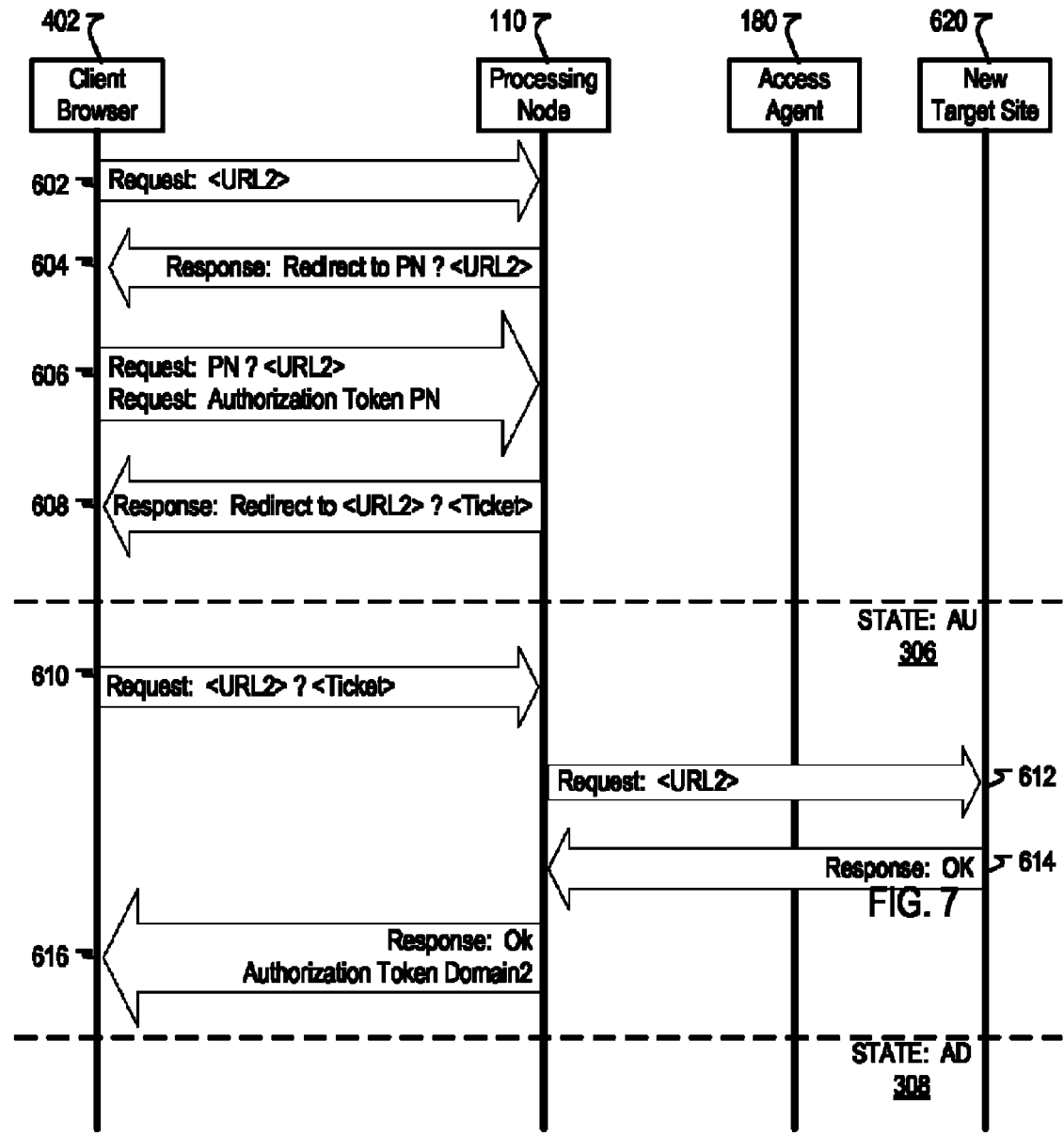
FIG. 6 is an example timing diagram of the management of a request to an unauthorized domain by an authorized user by the state manager.

FIG. 6 is an example timing diagram 600 for the management of a request to an unauthorized domain by an authorized user by the state manager 116a. In the realization 600, the processing node 110 processes a request for a domain from a client browser in the AU state 306. The processing node 110 is able to process the request without requesting authentication from the client browser, and the authorization is obtained in one transaction with the processing node.

When the client browser 402 is in the AD state 308 for a domain, the client browser 402 can request content from a target site 608 that is on a different domain than the domain of the AD state 308. The client browser 402 can also be in the AU state 306 only, and not in the AD state 308 for any domain. For example, the client browser may be in the AD state 308 for Domain 1 when the client browser 402 submits a request for content from Domain 2. Alternatively, the client browser 402 can be in the AU state 306 only and not in the AD state 308 for any domain.

In either of these scenarios, the state manager 116a of the processing node 110 can recognize that the client browser 402 is not in the AD state 308 for the requested domain of target site 620 based on the data passed with the request. For example, because the client browser 402 is not in the AD state 308 for the Domain 2, the client browser 402 does not have any domain authorization data to submit with the request 602. Based on the lack domain authorization data for Domain 2 submitted with request 602, the state manager 116a of the processing node 110 can determine that the client browser 402 is not in the AD state 308 for the Domain 2.

The state manager 116a can then determine whether the client browser 402 is in the AU state by soliciting domain authorization data for the domain of the state manager 116a, e.g., the domain of the processing node 110. For example, the state manager 116a can send a response 604 to the client browser 402, which requires the client browser 402 to send a redirected request to the processing node 110. Because the client browser 402 has authorized user data for the domain of the processing node 110, the client browser 402 can submit the authorized user data with redirected request 606. Based on the authorized user data submitted with the request 606, the state manager 116a can determine that the client browser 402 is in the AU state 306.

At this point, the state manager 116a can handle the request from the client browser 402 as it would any request from a client browser in the AU state 306. The state manager 116a can redirect the client browser 402 to submit a request to the target site 620 with the domain authorization data passed as a query parameter. For example, the state manager 116a can send response 608 back to the client browser 402. The response 608 redirects the client browser 402 to request the content directly from the target site 606, e.g., Company B Site on Domain 2.

The state manager 116a can process the request, and forward it to the target site 606. For example, the client browser 402 can submit the request 610 to the Company B Site on Domain 2 as required by the response 608. The state manager 116a at the processing node 110 can process the request 610, and forward it to the target site 606 as request 612.

The target site 606 can respond back to the client browser 402 through the processing node 110, and the state manager 116a can assign the client browser 402 to the AD state 308 for the domain of target site 606. For example, the Company B site on Domain 2 can send response 614 to the client browser 402. The processing node 110 receives the response 614, and forwards the response as response 616. The state manager 116a can submit the domain authorization data for Domain 2 with the response 616 in the form of an http cookie. Other forms to transmit the domain authorization data can also be used.

In addition to passing authorization data for a domain, the client browser 402 can pass data that is associated with the domain but that is not authentication or authorization data created by the processing node 110. This authentication or authorization data is not data that is generated at the target domain, but rather that is generated either by or for the state manager 116a. For example, where the target site is a shopping site, the client browser 402 can store as the contents of a shopping cart for the shopping site. The contents of the shopping cart can be passed by the client browser 402 as an http cookie with each request to the domain, along with domain authorization data for that domain. However, the http cookie for the shopping cart was generated at the domain of the target site, and is not considered authentication or authorization data. The domain authorization data for that domain in the request is stripped by the processing node 110, and thus the target site does not receive the domain authorization data. Accordingly, in some implementations, the domain authorization data for each domain is only transmitted between the processing node 110 and the client browser 402.

§5.0 Theft and Fraud Prevention

The authentication and/or authorization data submitted by the client browser 402 with each request determines whether the client browser 402 can request content from a target site. Without authentication and authorization data, a client browser 402 cannot request content through the network. However, unauthorized client browsers may still attempt to obtain unauthorized access to the network. For example, the data can be subject to a replay attack that can compromise the security of the network. In particular, an unauthorized client browser can either attempt to fraudulently create the authentication and/or authorization data, or attempt to utilize authentication and/or authorization data that was intended for a different client browser. The incidents of replay attacks can be minimized by identifying fraudulently created authentication or authorization data and identifying the theft of authentication or authorization data. In some implementations, the epoch manager 126, the epoch processor 116b and the source processor 116c can be used to minimize these kinds of replay attacks.

Figure 7:
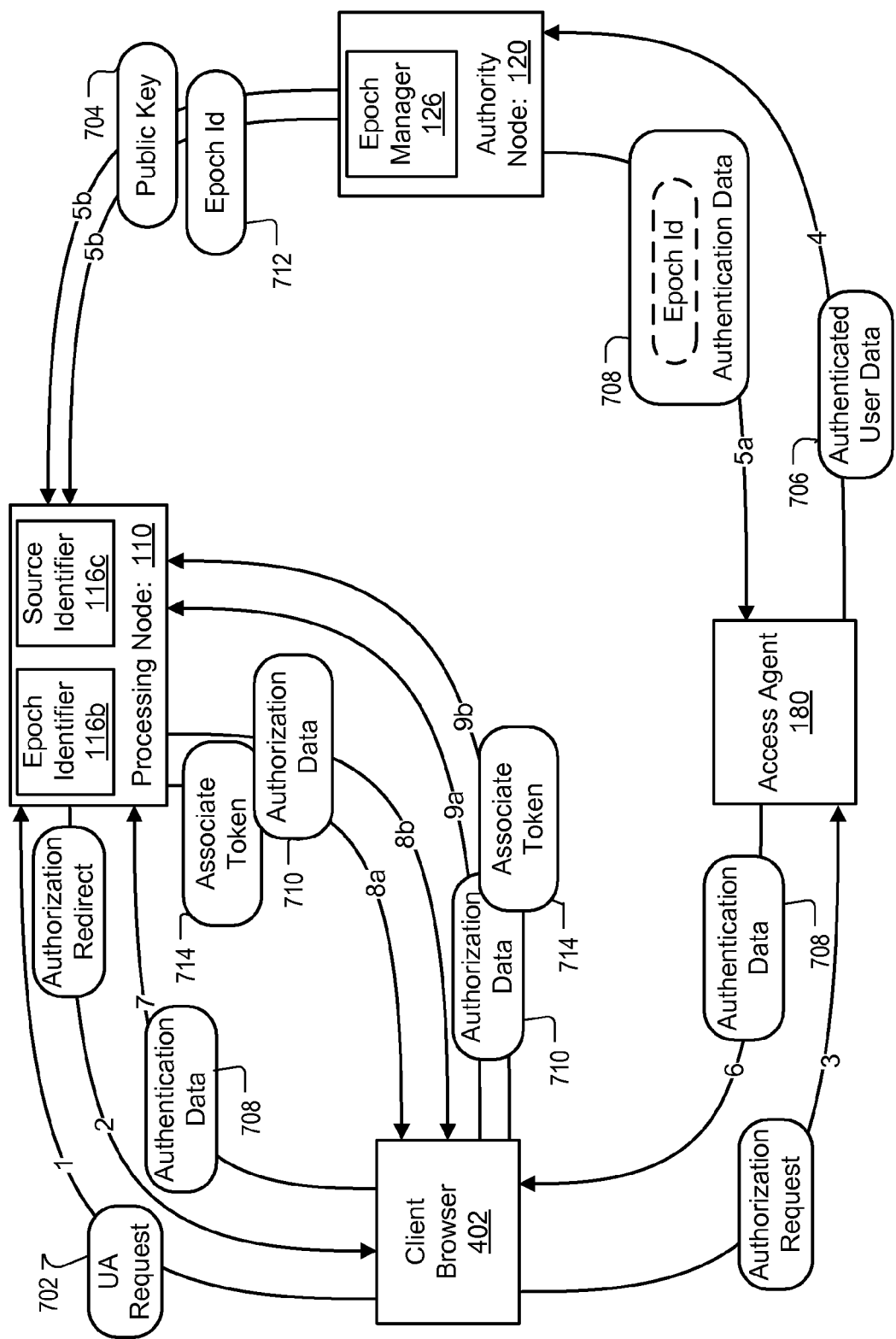
FIG. 7 is an example communication flow across a secured network.

FIG. 7 is an example communication flow 700 across a secured network. In the diagram 700, authentication and authorization data is passed through a network that utilizes an epoch manager 126, an epoch processor 116b, and a source processor 116c to minimize the replay attacks. The epoch manager 126 and the epoch processor 116b can be used to identify fraudulently generated authentication or authorization data. The source processor 116c can be used to identify the incidents of theft of authentication or authorization data.

§5.1 Fraud Prevention

In some implementations, authentication data 706 can be generated by the authority node 120 when the client browser 402 requests authentication. For example, if the client browser 402 submits an unauthenticated request 702 to the processing node 110, the processing node 110 may require the client browser 402 to obtain authentication. The processing node 110 can redirect the client browser 402 to the access agent 180, which can authenticate the user. In turn, the access agent 180 can provide the authority node 120 with the authenticated user data 706, e.g., authorized user credentials. For example, if a client browser 402 provides the access agent with a user ID and password that is validated, the access agent can provide the validated user ID to the authority node.

The authority node 120 can generate authentication data 708, e.g., a user authentication ticket, based on the authenticated user data 706 provided to the authority node. The authentication data 708 can be transmitted through a network and allows the processing node 110 to identify the authenticated user from the authentication data 708, and in some implementations, determine the user policy associated with the authenticated user data 706.

§5.1.1 Generation of Authentication Data with an Epoch Manager

In some implementations, the epoch manager 126 can be used by the authority node 120 to encrypt the authentication data 708 using a public epoch key of an epoch key pair. The epoch manager 126 can reduce the ability of an unauthorized client browser to synthetically generate the encrypted authentication data 708 by maintaining the epoch key pair only for a defined epoch. An epoch can be a period of time, a number of processed requests, or any other measurement of a period. An epoch ID 712 can be any quasi-unique or unique value that identifies a specific epoch.

For each epoch, the authority node creates an epoch key pair. The epoch key pair includes a private epoch key and a public epoch key, e.g., public key 704. Data encrypted by a private epoch key can only be decrypted by the public epoch key for the same epoch as the private epoch key. At the expiration of the epoch, a new epoch key pair is created that is used to encrypt the authentication data 708.

For example, during epoch 1, the authority node 120 creates epoch key pair 1. The authority node 120 can use the private epoch key of epoch 1 to generate encrypted authentication data 708 during epoch 1. The authentication data 708 generated during epoch 1 can only be decrypted by the public epoch key of epoch 1.

In some implementations, the epoch manager 126 modifies the authenticated user data 706 before generating the authentication data 708. The epoch manager 126 can associate an epoch ID 712 for the current epoch with the authenticated user data 706 to generate associated authenticated user data. The associated authenticated user data can be used to create an encrypted authentication data 708 that is associated with the current epoch. Thus, the authentication data 708 can be associated with the epoch during it was created. For example, if the authenticated user data is "UserA," during epoch 1 the associated authenticated user data would be a combination of the authenticated user data and the epoch ID, e.g., "UserA1." Similarly, the associated authenticated user data during epoch 2 would be "UserA2." The associated authenticated user data can be encrypted to generate the authentication data 708. Other combination schemes can also be used.

Thus, in some implementations, the authentication data 708 can only be decrypted by the public epoch key, e.g., public key 704, for the same epoch as the private epoch key that was used to encrypt the authenticated user data. Additionally, after the authentication data 708 is decrypted, the resulting data can be the authenticated user data 706 followed by an epoch ID 712 of the period in which the authentication data 708 was encrypted. This generation of authentication data 708 that is associated with an epoch reduces the ability to create fraudulent authentication data 708. Because the authentication data 708 can be the basis of the authorization data 710, e.g., the authorized user data and the domain authorization data, the authorization data is also difficult to fraudulently create. Fraudulently created authentication data 708 or authorization data 710 can be identified by the epoch processor 116b.

§5.1.2 Handling of Authentication Data Generated by an Epoch Manager

The epoch processor 116b can be at the processing node 110, and thus can be used to identify fraudulently created authentication data 708 or authorization data 710 submitted with a request.

After the epoch manager 126 generates an epoch key pair, the epoch manager 126 transmits the public epoch key 704 of the epoch key pair to the epoch processor 116b of the processing node 110. The epoch ID 712 of the public epoch key 704 is also transmitted to the epoch processor 116b. For example, when the epoch manager 126 generates an epoch key pair during epoch 1, the public epoch key generated during epoch 1 is transmitted to the epoch processor 116b with the epoch ID 1 as an attribute of the public epoch key. At the same time, the authority node 120 transmits the authentication data 708 back to the access agent 180 to be stored by the client browser 402.

When the processing node 110 receives authentication data 708 or authorization data 710, the epoch processor 116b of the processing node 110 analyzes the data. The epoch processor 116b attempts to decrypt the data using a valid public epoch key stored at the epoch processor 116b. For example, the epoch processor 116b can try to decrypt authentication data 708 or authorization data 710 using the public epoch key 704 for epoch 1.

In some implementations, a valid public epoch key is the current public epoch key 704 stored at the epoch processor 116b. Alternatively, in some implementations, a public epoch key is a valid public epoch key if the public epoch key was generated within some defined range of epochs of the current public epoch key. This epoch window allows authenticated users that have not accessed the processing node 110 for a time period less than the epoch window to not be required to re-authenticate if their current authentication data 708 or authorization data 710 is encrypted according to a previous epoch within the epoch window. The epoch processor 116b can attempt to decrypt the data using any valid public epoch key. For example, if the range of valid epochs is three epochs, then during the epoch 3, the public epoch keys of epoch 2 and epoch 1 remain valid. Thus, If the range of valid epochs is three epochs, and the epoch processor 116b can attempt to decrypt the data using the public epoch key of the epoch 1, epoch 2, and epoch 3, even though the current epoch is epoch 3. However, the public epoch key of epoch 1 is not used to decrypt the data when the current epoch is the epoch 4.

Some fraudulently created authentication data 708 or authorization data 710 can be identified by failed decryptions. However, it is possible for an unauthorized user to fraudulently generate authentication data 708 or authorization data 710 that is decrypted by a valid public epoch key. In this scenario, the epoch processor 116b will attempt to parse the decrypted value into user authorization data and an epoch ID.

If the epoch processor 116b is able to parse an epoch ID from the decrypted data, the epoch ID parsed from the decrypted value must match the epoch ID attributed to the public epoch key that was used to decrypt the data. If the user epoch ID parsed from the decrypted does not match the key epoch ID, i.e., the epoch ID attribute to the public epoch key, the decryption is not successful and the epoch processor 116b does not accept the authorization data 708 or authentication data 710.

For example, an unauthorized client browser may have been able to create encrypted authorization data that when decrypted by the public epoch key of epoch 5, produces an authenticated user ID "UserA." However, the value "UserA" cannot be parsed to identify the epoch ID of "5." Thus, the decryption by the epoch processor 116b fails. Similarly, if the encrypted authorization data can be decrypted by the public epoch key 704 of epoch 5 to produce the user ID "UserA1," the user epoch ID parsed from the decrypted data is 1. The user epoch ID does not match the epoch ID of 5 that was attributed to the public epoch key that was used to decrypt the data. Thus, the decryption by the epoch processor 116b fails.

In some implementations, if the decryption is successful by using a public epoch key that is valid, but not the current public epoch key, the epoch processor 116b can modify the authentication data 708 to associate the authentication data 708 with the current public epoch key. Similarly, any authorization data 710 based on the authentication data 708 can be modified as well. This modification of the epoch associated with the authentication and authorization data can be done by the epoch processor 116b without requiring a reauthentication by the client browser.

For example, the epoch processor 116b can receive authentication data 708 or authorization data 710 that can be successfully decrypted by the public epoch key of epoch 1. If the current public epoch key is of epoch 2, the epoch processor 116b can request an updated authentication data 708 for the epoch 2 from the access agent 180 or the authority node 120. The epoch processor 116b can then reissue the authentication data 708 or authorization data 710 for the user for the current epoch.

§5.2 Theft Prevention

An unauthorized client browser can attempt to intercept authorization data 710 intended for the client browser 402 or the processing node 110. The unauthorized client browser can then attempt to transmit the improperly obtained authorization data 710 on behalf of the unauthorized client, in an attempt to bypass the authorization requirements of the processing node 110. This type of theft can be prevented using the source processor 116c of the processing node 110. The source processor 116c utilizes an associate token 714 to maintain the source an initial request for authentication, and can require subsequent requests for authorization to originate from the same source as the initial request.

In some implementations, the source processor 116c can identify the source of the authentication data 708 received by the processing node. For example, when the authentication data 708 is transmitted by the client browser 402 to the processing node 110, a unique communication address of the client browser 402 can be determined by the source processor 116c, e.g., the port number the client browser 402 communicates on, the MAC address of the client browser 402, etc.

The source processor 116c can associate the communication address identified by the source processor 116c with the authentication data 708 that was transmitted in the initial request. For example, the source processor 116c can create a token containing the port number the client browser 402 uses to communicate to the processing node 110, and the authentication data 708. The data associated together by the source processor 116c can be encrypted to generate an associate token 714. The associate token 714 can be provided to the client browser 402 by the processing node 110, along with the authorization data 710 that is provided by the processing node 110.

Subsequent requests to the processing node 110 must contain the associate token 714. If the associate token 714 is not transmitted with a subsequent request, authorization is not granted by the processing node 110. If the associate token 714 is transmitted with the subsequent authorization, but the communication address specified in the associate token 714 does not match the communication address from which the subsequent request was transmitted, authorization is not granted. The source processor 116c may only grant authorization where an authorized request is sent from the same communication address that requested the authentication.

§6.0 Example Processes for Theft Prevention

Figure 8A:
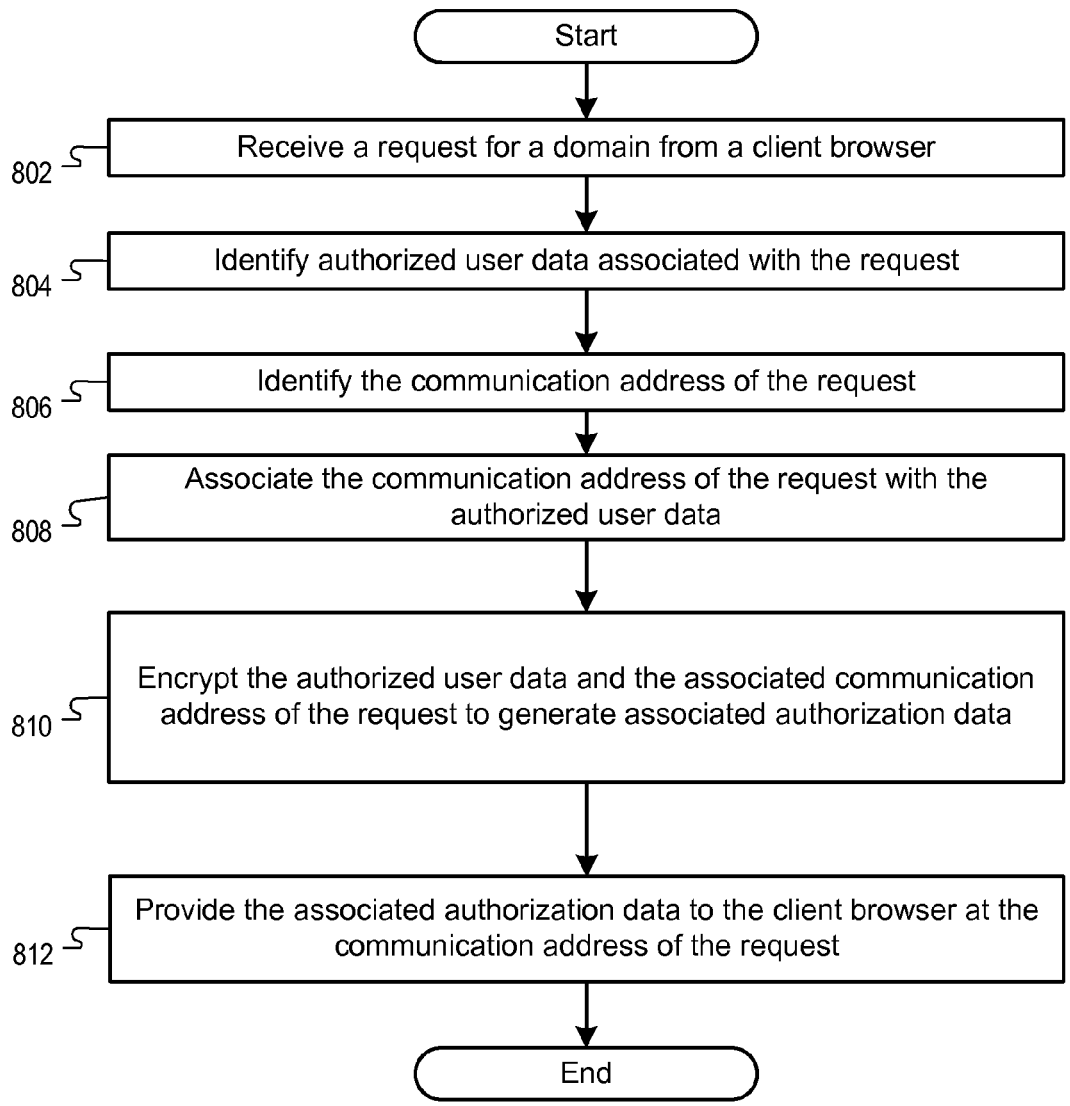
FIG. 8A is a flow diagram of an example process for preventing authorization data from being improperly obtained.

FIG. 8A is a flow diagram of an example process 800 for preventing authorization data from being improperly obtained. The process 800 can, for example, be implemented by the source processor 116c of FIG. 1, and as described in FIG. 7.

Stage 802 receives a request for a domain from a client browser. For example, the source processor 116c can receive a URL request from a client browser. The URL points to a domain. Thus, the source processor 116c can receive a request for a domain.

Stage 804 identifies authorized user data associated with the request. For example, the source processor 116c can identify any authorized user data transmitted with the request for the domain.

Stage 806 identifies the communication address of the request. For example, the source processor 116c can identify the port that the client browser 402 uses to communicated with the source processor 116c.

Stage 808 associates the communication address of the request with the authorized user data. For example, the source processor 116c associates the identified port with the authorization data transmitted in the request.

Stage 810 encrypts the authorized user data and the associated communication address of the request to generate associated authorization data. For example, the source processor 116c encrypts into the associate token the authorization data and the port associated with the authorization data.

Stage 810 provides the associated authorization data to the client browser at the communication address of the request. For example, the source processor 116c provides the associate token to the client browser 402 at the identified port.

Figure 8B:
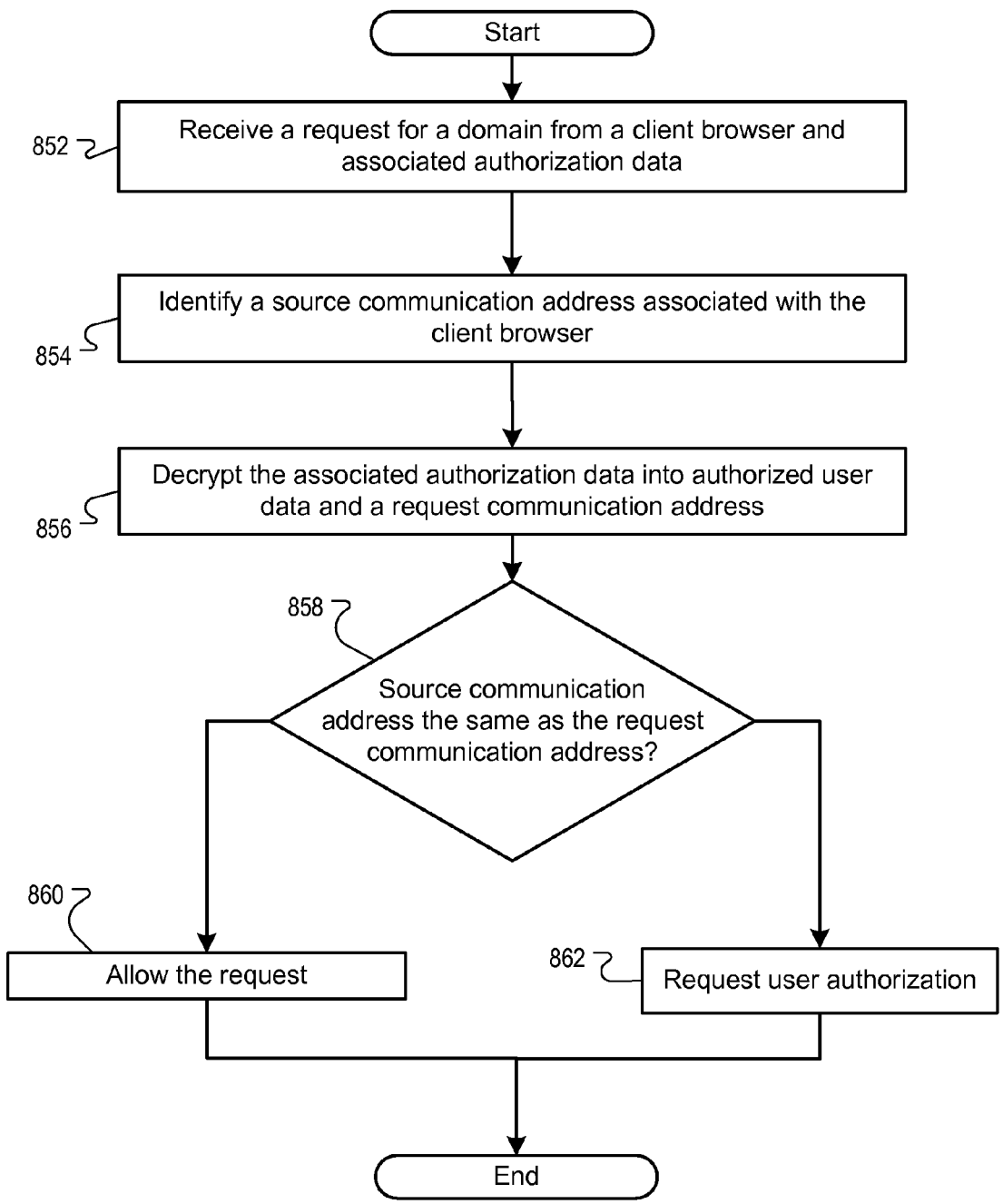
FIG. 8B is a flow diagram for handing authorization data that include source data.

FIG. 8B is a flow diagram of an example process 850 for preventing authorization data from being improperly obtained. The process 850 can, for example, be implemented by the source processor 116c of FIG. 1, and as described in FIG. 7.

Stage 852 receives a request for a domain from a client browser and associated authorization data. For example, the source processor 116c can receive a request for a URL request from a client browser. The URL points to a domain. Thus, the source processor 116c can receive a request for a domain. The source processor 116c can also receive with the request an associate token that is comprised of associated authorization data.

Stage 854 identifies a source communication address associated with the client browser. For example, the source processor 116c can identify the port that the client browser 402 uses to communicated with the source processor 116c.

Stage 856 decrypts the associated authorization data into authorized user data and a request communication address. For example, the source processor 116c can decrypt the associate token into authorized user data, e.g., authorization data, and a request communication address, e.g., a port associated with the authorization data.

Stage 858 determines whether the source communication address is the same as the request communication address. For example, the source processor 116c can compare the port identified by stage 854 with the port identified by stage 856.

If stage 858 determines that the source communication address is the same as the request communication address, stage 860 allows the request. For example, if the source processor 116c determines that the port identified by stage 854 is the same as the port identified by stage 856, then the request is allowed.

If stage 860 determines that the source communication address is not the same as the request communication address, stage 862 requests user authorization from the client browser at the request communication address. For example, if the source processor 116c determines that the port identified by stage 854 is not the same as the port identified by stage 856, then source processor 116c can request authorization from the client browser 402. In some implementations, the source processor 116c can trigger an external security service, e.g., the access agent 180 or the authority node 120, to obtain authorization from the client browser 402.

§7.0 Example Processes for Fraud Prevention

Figure 9:
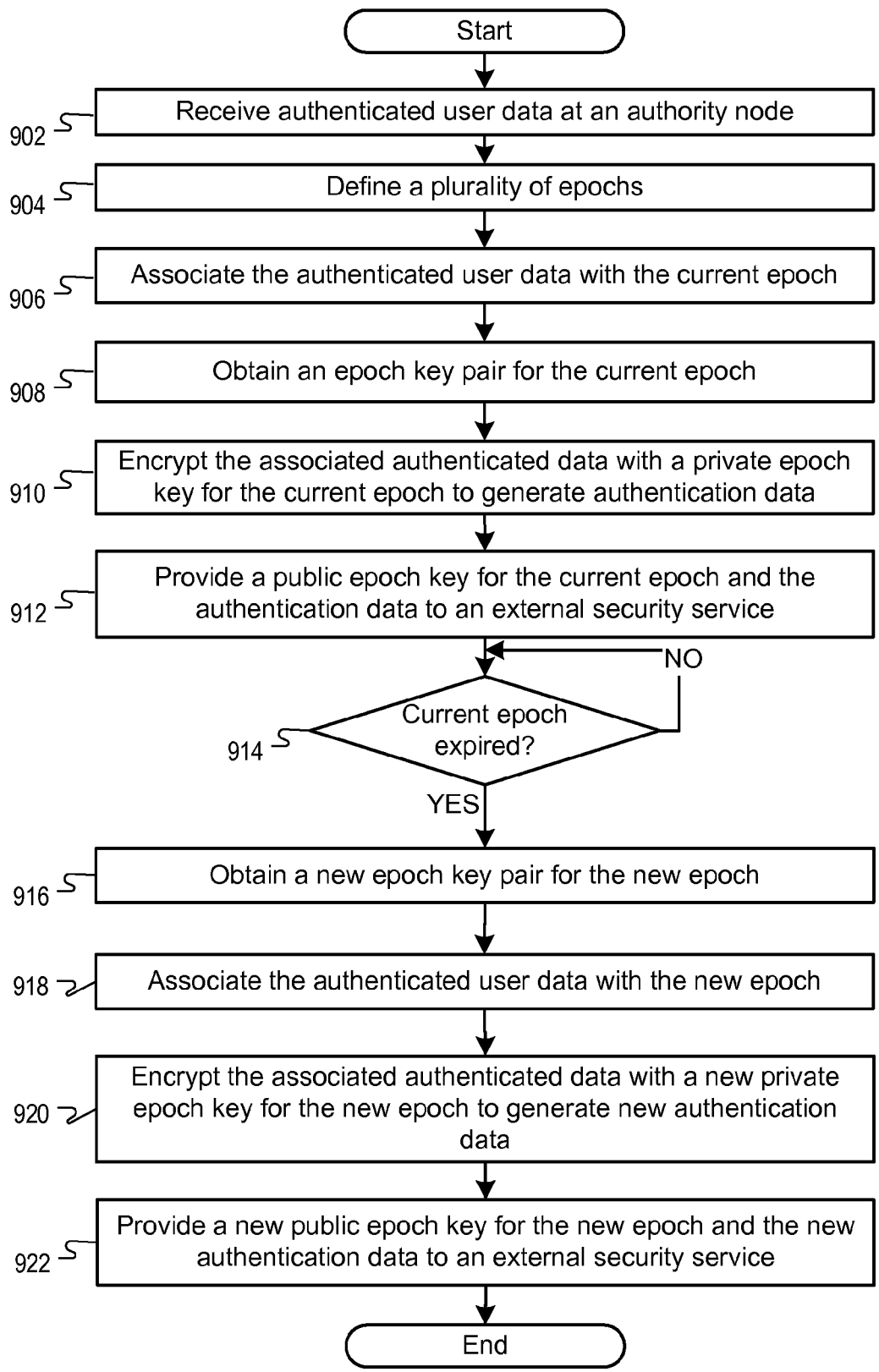
FIG. 9 is a flow diagram of an example process for generating authentication data associated with an epoch.

FIG. 9 is a flow diagram of an example process 900 for generating authentication data associated with an epoch. The process 900 can, for example, be implemented by the epoch manager 126 of FIG. 1, and as described in FIG. 7.

Stage 902 receives authenticated user data at an authority node. For example, the epoch manager 126 can receive authenticated user credentials at the authority node 120.

Stage 904 defines a plurality of epochs. For example, the epoch manager 126 can define that every fifteen minute interval is associated with an epoch. Each epoch can be identified by an identifier. Thus, the first fifteen minute interval is epoch 1, followed by epoch 2, etc.

Stage 906 associates the authenticated user data with the current epoch. For example, the epoch manager 126 can associate the user credentials with the current fifteen minute interval. If the current interval is the second fifteen minute interval, the epoch manager can accomplish this by associating the user credentials with epoch 2.

Stage 908 obtains an epoch key pair for the current epoch. For example, the epoch manager 126 can generate an epoch key pair for each epoch. The epoch manager 126 can obtain the epoch key pair for epoch 2.

Stage 910 encrypts the associated authenticated data with a private epoch key for the current epoch to generate authentication data. For example, the epoch manager 126 can use the private epoch key for epoch 2 to encrypt the association from stage 906. The encrypted association can become the authentication data associated with epoch 2.

Stage 912 provides a public epoch key for the current epoch and the authentication data to an external security service. For example, the epoch manager 126 can provide the public epoch key for epoch 2 to the processing node 110, which is a component of the external security service. The epoch manager 126 can provide the authentication data associated with epoch 2 to the access agent 180 or the processing node 110.

Stage 914 determines if the current epoch has expired. For example, the epoch manager 126 can determine that the second fifteen minute interval has expired, and that the third fifteen minute interval is the new current epoch, i.e., epoch 3.

If stage 914 determines that the current epoch has not expired, stage 914 continues to monitor the current epoch to determine when the epoch does expire. For example, the epoch manager 126 of FIG. 1 can continue to execute the stage 914 as defined above.

If stage 914 determines that the current epoch has expired, stage 912 obtains a new epoch key pair for the new epoch. For example, the epoch manager 126 can obtain a new epoch key pair for epoch 3.

Stage 918 associated the authenticated user data with the new epoch. For example, the epoch manager 126 can associate the user credentials with the third fifteen minute interval. The epoch manager can accomplish this by associating the user credentials with epoch 3.

Stage 920 then encrypts the associated authentication data with a new private epoch key for the new epoch to generate new authentication data. For example, the epoch manager 126 can use the private epoch key for epoch 3 to encrypt the association from stage 918. The encrypted association can become the authentication data associated with epoch 3.

Stage 922 then provides a new public epoch key for the new epoch and the new authentication data to an external security service. For example, the epoch manager 126 can provide the public epoch key for epoch 3 to the processing node 110, which is a component of the external security service. The epoch manager 126 can provide the authentication data associated with epoch 3 to the access agent 180 or the processing node 110.

Figure 10:
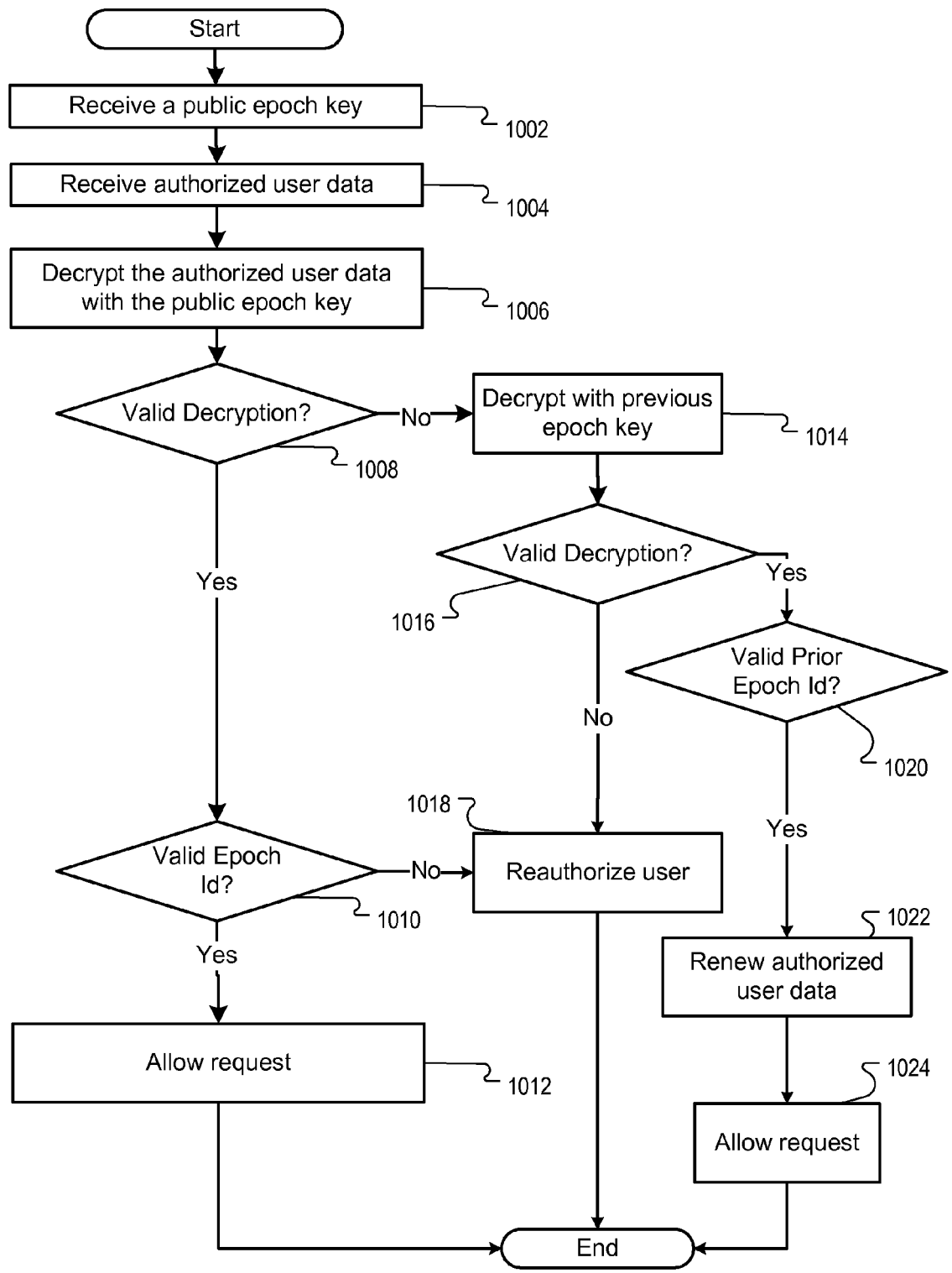
FIG. 10 is a flow diagram of an example process for handling authentication data associated with an epoch.

FIG. 10 is a flow diagram of an example process 1000 for handling authentication data associated with an epoch. The process 1000 can, for example, be implemented by the epoch processor 116b of FIG. 1, and as described in FIG. 7.

Stage 1002 receive a public epoch key. For example, the epoch processor 116b can receive a public epoch key for an epoch. The epoch processor 116b can also receive as an attribute of the public epoch key an epoch ID. The epoch ID can identify the epoch in which the public epoch key (and a corresponding private epoch key) was created.

Stage 1004 receives authorized user data. For example, the epoch processor 116b can receive authorized user data in the form of an authorization token.

Stage 1006 decrypts the authorized user data with the public epoch key. For example, the epoch processor 116b can use the public epoch key it received in stage 1002 to decrypt the authorized user data from the authorization token received in stage 1004.

Stage 1008 determines if the decryption of stage 1006 was valid. For example, if the epoch processor 116b can decrypt the authorized user data using the public epoch key of stage 1002, the decryption of stage 1006 was valid. If the epoch processor 116b is unable to decrypt the authorized user data using the public epoch key of stage 1002, the decryption of stage 1006 is not valid.

If stage 1008 determines that the decryption is valid, stage 1010 determines if the decrypted data contains a valid epoch ID. For example, if the decrypted value that resulted from the decryption of stage 1006 can be parsed to identify an epoch ID, e.g. a user epoch ID, the epoch processor 116b can determine whether the user epoch ID is the same as the epoch ID of the public key, e.g., the key epoch ID, that was used to decrypt the data. If the user epoch ID is the same and the key epoch ID, stage 1010 determines that the decrypted data contains a valid epoch ID. If the user epoch ID is not the same as the key epoch ID, stage 1010 determines that the decrypted data does not contain a valid epoch ID.

If stage 1010 determines that the decryption contains a valid epoch ID, stage 1012 allows the request. For example, where the user epoch ID is the same as the key epoch ID, the epoch processor 116b can determine that the authorized user data is not fraudulent and allow the request.

If stage 1008 determines that the decryption is not valid, stage 1014 attempts to decrypt the authorized user data with previous public epoch keys in the range of valid epochs. For example, the epoch processor 116b can use a previous public epoch key stored at the epoch processor 116b to decrypt the authorized user data from the authorization token received in stage 1004. A previous public epoch key can be used if the previous epoch key pair was generated within a range of valid epochs.

Stage 1016 then determines if the decryption of stage 1014 was valid. For example, if the epoch processor 116b can decrypt the authorized user data using a previous public epoch stored at the epoch processor 116b, the decryption of stage 1014 was valid. If the epoch processor 116b is unable to decrypt the authorized user data using a previous public epoch key stored at the epoch processor, the decryption of stage 1014 is not valid.

If stage 1016 determines that the decryption of stage 1014 was valid, stage 1020 determines if the decrypted data contains a valid epoch ID. For example, if the decrypted value that resulted from the decryption of stage 1014 can be parsed to identify an epoch ID, e.g. a user epoch ID, the epoch processor 116b can determine whether the user epoch ID is within an acceptable range of epochs as the epoch ID of the public epoch key, e.g., the key epoch ID, that was used to decrypt the data. If the user epoch ID is within an acceptable range of epochs as the key epoch ID, stage 1020 determines that the decrypted data contains a valid epoch ID. If the user epoch ID is not the within an acceptable range of epochs as the key epoch ID, stage 1020 determines that the decrypted data does not contain a valid epoch ID.

If stage 1020 determines that the decrypted data contains a valid epoch ID, stage 1022 renews the authorized user data. For example, if the epoch processor 116b can determine that the decrypted data contains a valid epoch ID using a previous public epoch key, the authorized user data is associated with a previous epoch ID that is still valid. The epoch processor 116b can request the access agent 180 or the authority node 120 to provide a current authorized user data associated with the current epoch. The epoch processor 116b substitute the authorized user data received at stage 1004 with the current authorized user associated with the current epoch.

Stage 1024 then allows the request. For example, the epoch processor 116b has determined that the authorized user data is not fraudulent, and can allow the request.

If stage 1010 determines that the decrypted data of stage 1006 does not contain a valid epoch ID, or if stage 1020 determines that the decrypted data of stage 1016 does not contain a valid ID, stage 1018 reauthorizes the user. For example, if the epoch processor 116b has determined that the decrypted data does not contain an valid ID, the epoch processor 116b can require reauthorization by the user.

§8.0 Example Processes for State Management

Figure 11:
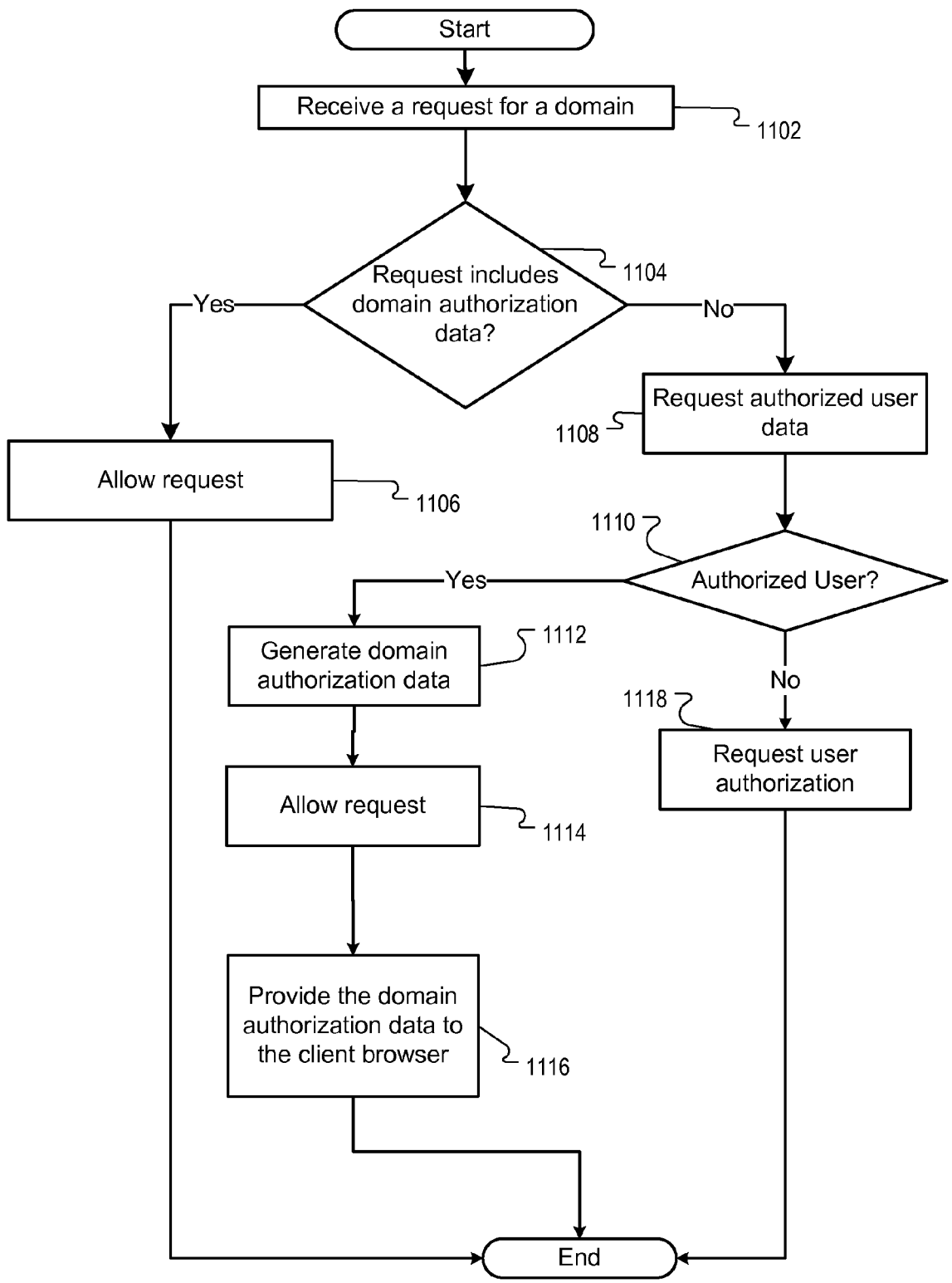
FIG. 11 is a flow diagram of an example process for handling authorized and unauthorized requests at a processing node.

FIG. 11 is a flow diagram of an example process for handling authorized and unauthorized requests at a processing node. The process 1100 can, for example, be implemented by the state manager 116a of FIG. 1, and as described in FIG. 4-6.

Stage 1102 receives a request for a domain. For example, the stage manager 116a can receive a request for a New Site 1 at Domain N.

Stage 1104 determines whether the request includes domain authorization data. For example, the state manager 116a can determine whether the request included domain authorization data for Domain N.

If stage 1104 determines that the request includes domain authorization data, stage 1106 allows the request. For example, if the state manager 116a determines that the request includes domain authorization data for Domain N, the state manager 116a can allow the request to Domain N for New Site 1.

If stage 1104 determines that the request does not include domain authorization data, stage 1108 requests authorized user data from the client browser 402. For example, if the state manager 116a determines that the request did not includes domain authorization data for Domain N, the state manager 116a can request authorized user data from the client browser 402.

Stage 1110 then determines whether the client browser 402 provided authorized user data. For example, the state manager 116a can determine if the client browser provided the authorized user data.

If stage 1110 determines that client browser 402 provided authorized user data, stage 1112 generates domain authorization data. For example, if the state manager 116a determines that the client browser provided user authorization data, the state manager 116a can generate domain authorization data for Domain N based on the authorized user data.

Stage 1114 allows the request. For example, the state manager 116a can allow the request to Domain N for New Site 1.

Stage 1116 then provides the domain authorization data to the client browser. For example, the state manager 116a can provide domain authorization data to the client browser 402 with the response from Domain N.

If stage 1110 determines that client browser 402 did not provide authorized user data, stage 1118 requests user authorization from the client browser. For example, if the state manager 116a determines that the client browser 402 did not provide authorized user data, the state manager 1116a can request authorization from the client browser 402. In some implementations, the state manager 116a can trigger an external security service, e.g., the access agent 180 or the authority node 120, to obtain authorization from the client browser 402.

Embodiments of the subject matter and the functional operations described in this specification can be implemented in digital electronic circuitry, or in computer software, firmware, or hardware, including the structures disclosed in this specification and their structural equivalents, or in combinations of one or more of them. The computer readable medium can be a machine readable storage device, a machine readable storage substrate, a memory device, a composition of matter effecting a machine readable propagated signal, or a combination of one or more of them.

A computer program (also known as a program, software, software application, script, manager, processor, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
    receiving, at a processing node comprising a communication device, a first request for a domain from a client browser, the client browser associated with a first communication address, wherein the processing node is part of a distributed security system located external from the client browser and external from the domain configured to monitor communications associated with the client browser in an overlay network, wherein the distributed security system is configured to detect and preclude security threats comprising malware, spyware, and other undesirable content sent from or requested by the client browser or the domain;
    identifying a first authorized user data associated with the first request;
    identifying at the processing node the first communication address associated with the client browser;
    associating at the processing node the first communication address of the client browser with the first authorized user data;
    encrypting at the processing node the first authorized user data and the associated first communication address to generate a first associated authorization data comprising an associate token, wherein the first communication address includes a port address used by the client browser to communicate with the processing node, thereby preventing intercepting of the first associated authorization data by an unauthorized client, wherein the encrypting uses a private key that is generated at the processing node;
    providing the first associated authorization data to the client browser at the first communication address; and
    processing a data request at the processing node for the domain from the client browser using the first associated authorization data, wherein the client browser is prevented, by the processing node, from accessing the domain without the first associated authorization data comprising the associate token and without a communication address associated with the data request matching the communication address associated with the associate token, wherein the first associated authorization data determines eligibility of the client browser to complete an action associated with the domain.

2. The method of claim 1, wherein the request is an http request.

3. The method of claim 1, wherein receiving at a processing node a first request from a client browser comprises receiving at a processing node a first request for a domain from a client browser identifiable by a communication address.

4. The method of claim 1, wherein the first communication address of the client browser is a port address.

5. The method of claim 1, wherein the first associated authorization data is an http cookie.

6. The method of claim 1, wherein the authorized user data is based on authentication data for a user.

7. The method of claim 1, further comprising:
    receiving at the processing node a second request for a domain, and a second associated authorization data;
    decrypting at the processing node the second associated authorization data into a second authorized user data and a second communication address;
    determining whether the second communication address is the same as the first communication address; and
    if the second communication address is the same as the first communication address, allowing the request;
    if the second communication address is not the same as the first communication address, requesting user authorization from the client browser at the second communication address.

8. The method of claim 7, wherein requesting user authorization comprises: requesting user authentication from the client browser at the second communication address; and generating authorized user data based on the requested user authentication.

9. A software stored in a non-transitory computer readable storage medium and comprising instructions executable by a data processing system and upon such execution cause the data processing system to perform operations comprising:
    receiving a request for a domain from a client browser, the client browser associated with a communication address;
    identifying authorized user data associated with the request;
    identifying the communication address associated with the client browser;
    associating the communication address of the client browser with the authorized user data;
    encrypting the authorized user data and the communication address to generate associated authorization data comprising an associate token, wherein the communication address includes a port address used by the client browser to communicate with the data processing system, thereby preventing intercepting of the first associated authorization data by an unauthorized client, wherein the encrypting uses a private key that is generated at a processing node;
providing the associated authorization data to the client browser at the communication address; and
processing a data request for the domain from the client browser using the associated authorization data, wherein the data request is provided to the processing node and not directly to the domain, wherein the processing node is part of a distributed security system located external from the client browser and external from the domain configured to monitor communications associated with the client browser in an overlay network, and wherein the client browser is prevented, by the processing node, from accessing the domain without the associated authorization data comprising the associate token and without a communication address associated with the data request matching the communication address associated with the associate token, wherein the associated authorization data determines eligibility of the client browser to complete an action associated with the domain, and wherein the distributed security system is configured to detect and preclude security threats comprising malware, spyware, and other undesirable content sent from or requested by the client browser or the domain.

10. The software of claim 9, wherein the communication address is a port address.

11. The software of claim 9, wherein the request is an http request.

12. The software of claim 9, wherein the associated authorization data is received in the form of an http cookie.

13. The software of claim 9, wherein the authorized user data is based on authentication data.

14. A software stored in a non-transitory computer readable storage medium and comprising instructions executable by a data processing system and upon such execution cause the data processing system to perform operations comprising:
receiving a request for a domain and associated authorization data from a client browser, the client browser associated with a request communication address, wherein the client browser communicates the request to the data processing system and not directly to the domain, wherein the data processing system is part of a distributed security system located external from the client browser and external from the domain configured to monitor communications associated with the client browser in an overlay network, wherein the distributed security system is configured to detect and preclude security threats comprising malware, spyware, and other undesirable content sent from or requested by the client browser or the domain;
preventing the request if the associated authorization data fails to include an associate token;
identifying the request communication address associated with the client browser;
decrypting the associated authorization data into authorized user data and a source communication address from the associate token, wherein the client browser received the associated authorization data encrypted with source communication address based on communicating with the data processing system via the source communication address, thereby preventing intercepting of the associated authorization data by an unauthorized client, wherein the decrypting uses a public key that is generated at a processing node;
determining whether the request communication address is the same as the source communication address in the associate token; and
if the request communication address is the same as the source communication address, allowing the request comprising processing the request to the domain; and
if the request communication address is not the same as the source communication address, requesting user authorization from the client browser at the request communication address;
wherein the client browser is prevented, by the data processing system, from accessing the domain without the associated authorization data, wherein the associated authorization data determines eligibility of the client browser to complete an action associated with the domain.

15. A network security system, comprising:
a plurality of communication device nodes external to network edges of an external system, each node comprising:
a source processor configured to receive at a processing node a first request for a first domain from a first client browser, the first client browser associated with a first communication address;
wherein the source processor is configured to:
identify a first authorized user data associated with the first request;
identify at the processing node the first communication address associated with the first client browser;
associate at the processing node a first communication address of the first client browser with the first authorized user data;
encrypt at the processing node the first authorized user data and the first communication address to generate a first associated authorization data comprising an associate token, wherein the first communication address includes a port address used by the first client browser to communicate with the processing node, thereby preventing intercepting of the first associated authorization data by an unauthorized client, wherein the encrypting uses a private key that is generated at the processing node;
provide the first associated authorization data to the first client browser at the first communication address; and
process the data request at the processing node for the first domain from the first client browser using the first associated authorization data responsive to a presence of the associate token in the data request and a communication address of the data request matching the first communication address associated with the associate token, wherein the data request is provided to the processing node and not directly to the first domain;
wherein the processing node is part of the network security system located external from the first client browser and the first domain configured to monitor communications associated with the first client browser in an overlay network, and wherein the client browser is prevented, by the processing node, from accessing the first domain without the first associated authorization data, wherein the first associated authorization data determines eligibility of the client browser to complete an action associated with the first domain, wherein the network security system is configured to detect and preclude security threats comprising malware, spyware, and other undesirable content sent from or requested by the first client browser or the first domain.

16. The system of claim 15, the source processor further configured to:
- receives a second request for a second domain and second associated authorization data from a second client browser, the second client browser associated with a second communication address;
- identify a second communication address associated with the second client browser;
- decrypts the second associated authorization data into second authorized user data and the second communication address;
- determine whether the second communication address is the same as the first communication address;
- if the second communication address is the same as the first communication address, allow the second request;
- if the second communication address is not the same as the first communication address, request user authorization from the second client browser at the second communication address.

17. The system of claim 16, wherein the first domain and the second domain are the same domain.

* * * * *